United States Patent
Shibata

(10) Patent No.: US 11,417,912 B2
(45) Date of Patent: Aug. 16, 2022

(54) SECONDARY BATTERY AND METHOD OF MANUFACTURING THE SAME

(71) Applicant: Murata Manufacturing Co., Ltd., Nagaokakyo (JP)

(72) Inventor: Hidetaka Shibata, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 278 days.

(21) Appl. No.: 16/530,226

(22) Filed: Aug. 2, 2019

(65) Prior Publication Data
US 2019/0363402 A1 Nov. 28, 2019

Related U.S. Application Data

(63) Continuation of application No. PCT/JP2018/011653, filed on Mar. 23, 2018.

(30) Foreign Application Priority Data

Apr. 7, 2017 (JP) .............................. JP2017-076954

(51) Int. Cl.
*H01M 10/0587* (2010.01)
*H01M 10/0525* (2010.01)
(Continued)

(52) U.S. Cl.
CPC ....... *H01M 10/0587* (2013.01); *H01M 4/139* (2013.01); *H01M 10/0525* (2013.01);
(Continued)

(58) Field of Classification Search
CPC ........ H01G 11/12; H01G 11/22; H01G 11/76; H01G 11/84; H01M 10/052;
(Continued)

(56) References Cited

U.S. PATENT DOCUMENTS

| | | | | |
|---|---|---|---|---|
| 2008/0280197 A1* | 11/2008 | Machida | ................ | H01M 4/13 429/129 |
| 2015/0079475 A1* | 3/2015 | Yamamoto | ............. | C01G 53/50 429/223 |
| 2016/0293994 A1 | 10/2016 | Choi et al. | | |

FOREIGN PATENT DOCUMENTS

| | | |
|---|---|---|
| JP | H05101830 A | 4/1993 |
| JP | H11121016 A | 4/1999 |

(Continued)

OTHER PUBLICATIONS

International Search Report issued in PCT/JP2018/011653, dated Jun. 26, 2018.
(Continued)

*Primary Examiner* — Lingwen R Zeng
(74) *Attorney, Agent, or Firm* — ArentFox Schiff LLP

(57) ABSTRACT

A secondary battery that includes a partial electrode assembly having a planar stacking structure in which a plurality of electrode constituting layers are stacked, the plurality of electrode constituting layers each include a pair of electrodes and a separator therebetween, and at least one of the pair of electrodes includes a double-sided electrode having an electrode material layer on opposed main surfaces of a current collector; and an outermost layer electrode surrounding the partial electrode assembly along at least a portion of a contour of the partial electrode assembly in a cross-sectional view thereof, the outermost layer electrode including a single-sided electrode having an outermost electrode material layer on one main surface of an outermost current collector.

22 Claims, 12 Drawing Sheets

(51) Int. Cl.
  *H01M 10/0585* (2010.01)
  *H01M 4/139* (2010.01)
  *H01M 4/02* (2006.01)
  *H01M 50/46* (2021.01)
  *H01G 11/84* (2013.01)
  *H01G 11/76* (2013.01)
  *H01G 11/12* (2013.01)
  *H01M 10/058* (2010.01)
  *H01M 4/04* (2006.01)
  *H01G 11/22* (2013.01)
  *H01M 10/052* (2010.01)

(52) U.S. Cl.
  CPC ........ *H01M 10/0585* (2013.01); *H01G 11/12* (2013.01); *H01G 11/22* (2013.01); *H01G 11/76* (2013.01); *H01G 11/84* (2013.01); *H01M 4/0404* (2013.01); *H01M 10/052* (2013.01); *H01M 10/058* (2013.01); *H01M 50/46* (2021.01); *H01M 2004/027* (2013.01); *H01M 2004/028* (2013.01); *Y02E 60/10* (2013.01); *Y02P 70/50* (2015.11)

(58) Field of Classification Search
  CPC ........... H01M 10/0525; H01M 10/058; H01M 10/0585; H01M 10/0587; H01M 2004/027; H01M 2004/028; H01M 4/0404; H01M 4/139; H01M 50/46; Y02E 60/10; Y02P 70/50
  See application file for complete search history.

(56) References Cited

FOREIGN PATENT DOCUMENTS

| | | |
|---|---|---|
| JP | 2013218804 A | 10/2013 |
| JP | 2014093128 A | 5/2014 |
| JP | 2014103082 A | 6/2014 |
| JP | 2014120456 A | 6/2014 |
| JP | 2015128018 A | 7/2015 |

OTHER PUBLICATIONS

Written Opinion of the International Searching Authority issued in PCT/JP2018/011653, dated Jun. 26, 2018.

\* cited by examiner

FIG. 12 - PRIOR ART
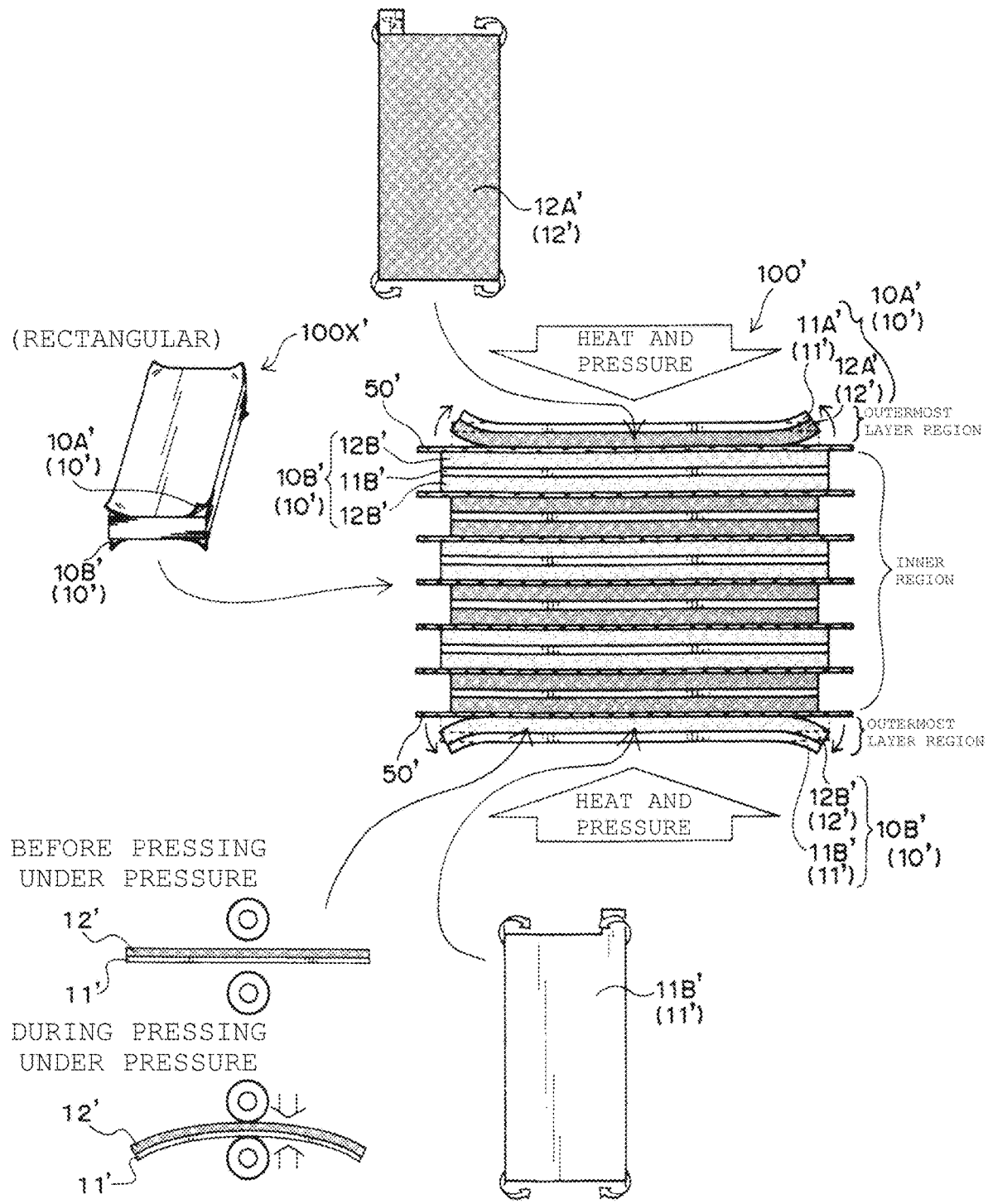

SECONDARY BATTERY AND METHOD OF MANUFACTURING THE SAME

CROSS REFERENCE TO RELATED APPLICATIONS

The present application is a continuation of International application No. PCT/JP2018/011653, filed Mar. 23, 2018, which claims priority to Japanese Patent Application No. 2017-076954, filed Apr. 7, 2017, the entire contents of each of which are incorporated herein by reference.

FIELD OF THE INVENTION

The present invention relates to a secondary battery and a method of manufacturing the secondary battery.

BACKGROUND OF THE INVENTION

Conventionally, a secondary battery that can be repeatedly charged and discharged has been used for various applications. For example, secondary batteries are used as power sources of electronic devices such as smart phones and notebook computers.

In recent years, with the increasing demand for reduction in thickness and size of the electronic devices, there has been a demand for thinner, smaller and higher-capacity secondary batteries. In order to meet such a demand, Patent Document 1 discloses that an electrode assembly which is a constituent of a secondary battery has a planar stacking structure in which a plurality of electrode constituting layers, including a positive electrode, a negative electrode and a separator, are stacked in cross-sectional view. The positive electrode and the negative electrode of the electrode assembly each include an electrode material layer in which an active material is coated on a main surface of a current collector. Patent Document 1 discloses that in the electrode of the outermost layer among the plurality of electrodes provided along the stacking direction, the electrode material layer is provided only on one main surface of the current collector in a cross-sectional view thereof.

Patent Document 1: Japanese Patent Application Laid-Open No. 2014-120456

SUMMARY OF THE INVENTION

Here, the inventor of the present application has found that the following problems may occur when the electrode material layer is provided only on one main surface of the current collector in cross-sectional view in the electrode of the outermost layer.

As shown in FIG. 12, an electrode assembly 100' having planar stacking structure (such as an electrode assembly 100X' having a rectangular shape in planar view) is obtained by alternately arranging a positive electrode 10A' and a negative electrode 10B' while sandwiching a separator 50' therebetween along the stacking direction and then heat-pressing (also referred to as "hot-pressing") the laminate to connect layers to each other. Each of the plurality of electrodes 10' provided along the stacking direction is obtained by applying and drying an electrode material layer 12' on at least one main surface of a current collector 11' and then performing pressure treatment for obtaining a desired density. Specifically, the electrode 10' located in an inner region of the electrode assembly 100' is obtained by applying and drying the electrode material layer 12' on both main surfaces of the current collector 11' and then performing the pressure treatment for obtaining a desired density. On the other hand, the electrode 10' located in an outermost layer region of the electrode assembly 100' is obtained by applying and drying the electrode material layer 12' only on one main surface of the current collector 11' and then performing the pressure treatment for obtaining a desired density. While the current collector 11' is mainly formed from a metal foil, that is, a metal member, the electrode material layer 12' mainly contains an active material and a binder (polymer compound). That is, the kinds of constituent materials of the current collector 11' and the electrode material layer 12' are different from each other.

The difference in the kind of material between the current collector 11' and the electrode material layer 12' may lead to differences in degree of stretching of the current collector 11' and the electrode material layer 12' when the pressure treatment is performed to obtain each of the electrodes 10' having a desired density. Specifically, due to the difference in the degree of stretching, the electrode material 12' tends to be stretched relatively larger than the current collector 11' at the time of pressure treatment for obtaining the electrode 10' (corresponding to a single-sided electrode) positioned at the outermost layer. In particular, in the electrode 10' (corresponding to a single-sided electrode) positioned at the outermost layer, since the electrode material layer 12' is provided only on one side of the main surface of the current collector 11', due to the difference in the degree of stretching, warpage stress is likely to occur in the electrode 10' (corresponding to a single-sided electrode) positioned at the outermost layer. The occurrence of such warpage stress may lead to warpage of the electrode 10' (corresponding to a single-sided electrode) positioned at the outermost layer (see the lower left portion of FIG. 12).

Due to the warpage of the electrode 10' (corresponding to a single-sided electrode) positioned at the outermost layer, when forming the electrode assembly 100', the electrode 10' positioned at the outermost layer may not be suitably adhered entirely to the separator 50' positioned between the electrode 10' positioned at the outermost layer and the electrode 10' (corresponding to a double-sided electrode) in the inner region. Thus, the outermost electrode 10' may not function properly as a constituent of the electrode assembly 100'. As a result, there is a possibility that a secondary battery including the electrode assembly 100' as a whole cannot suitably exhibit desired battery characteristics.

The present invention has been made in view of such circumstances. Specifically, an object of the present invention is to provide a secondary battery, which includes an electrode assembly capable of suitably suppressing occurrence of warpage stress in an outermost layer electrode in which an electrode material layer is provided on one main surface of a current collector in cross-sectional view, and a method of manufacturing the secondary battery.

In order to achieve the above object, an embodiment of the present invention provides a secondary battery that includes a partial electrode assembly having a planar stacking structure in which a plurality of electrode constituting layers are stacked, the plurality of electrode constituting layers each include a pair of electrodes and a separator therebetween, and at least one of the pair of electrodes includes a double-sided electrode having an electrode material layer on opposed main surfaces of a current collector; and an outermost layer electrode surrounding the partial electrode assembly along at least a portion of a contour of the partial electrode assembly in a cross-sectional view thereof, the outermost layer electrode including a single-sided electrode having an outermost electrode material layer on one main surface of an outermost current collector.

In order to achieve the above object, an embodiment of the present invention provides a method of manufacturing a secondary battery that includes forming a partial electrode assembly having a planar stacking structure in which a plurality of electrode constituting layers are stacked, the plurality of electrode constituting layers each including a pair of electrodes and a separator disposed therebetween, wherein at least one of the pair of electrodes includes a double-sided electrode having an electrode material layer on opposed main surfaces of a current collector; and surrounding the partial electrode assembly along at least a portion of a contour of the partial electrode assembly in a cross-sectional view thereof, the outermost layer electrode including a single-sided electrode having an outermost electrode material layer on one main surfaces of an outermost current collector.

According to an embodiment of the present invention, it is possible to suppress the occurrence of the warpage stress in the outermost layer electrode in which the electrode material layer is provided on one main surface of the current collector in cross-sectional view.

BRIEF EXPLANATION OF THE DRAWINGS

FIG. 12 is a schematic view showing a technical problem found by the inventor of the present application.

DETAILED DESCRIPTION OF THE INVENTION

Figure 1:
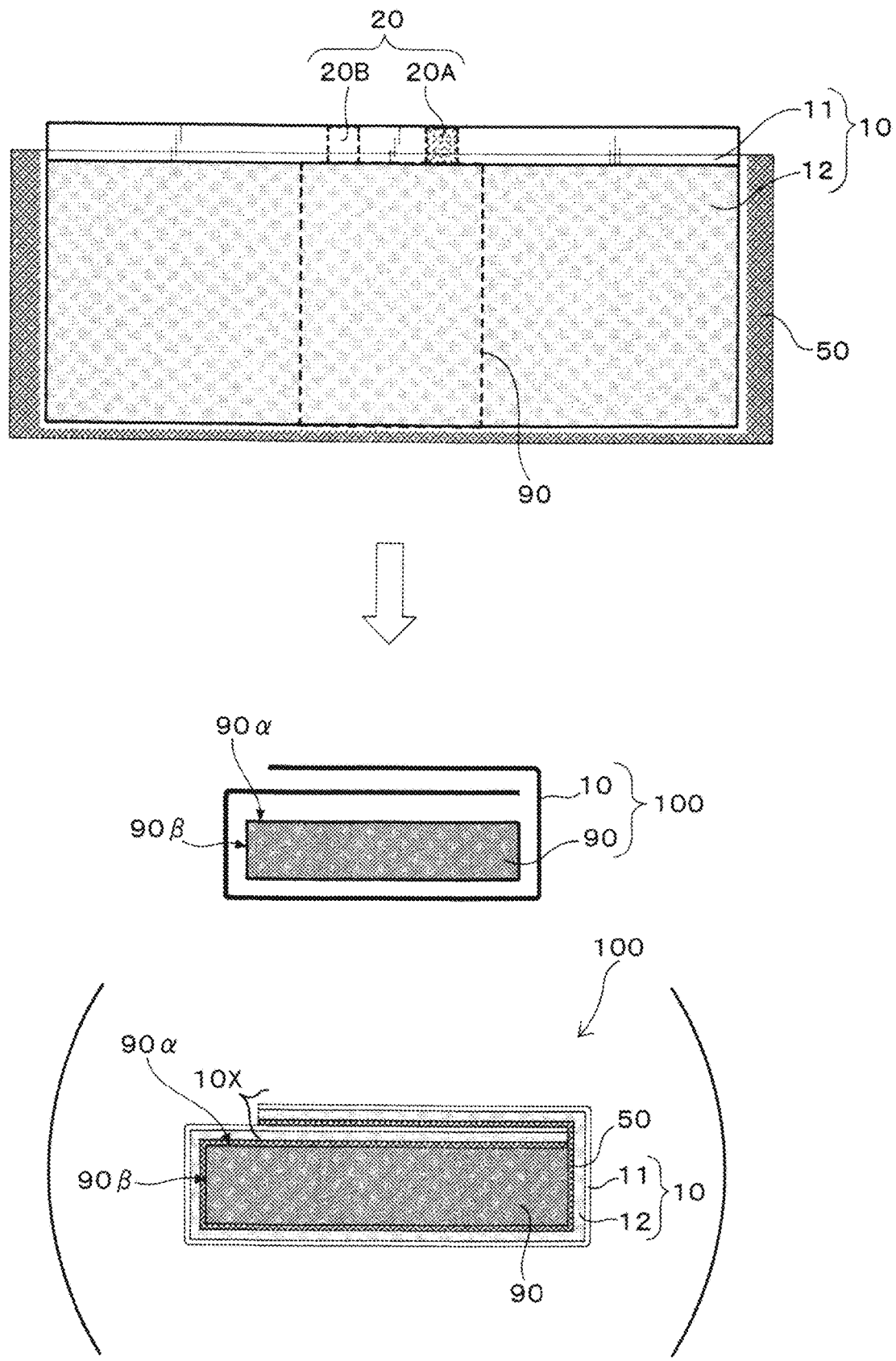
FIG. 1 is a schematic view of an electrode assembly of a secondary battery according to an embodiment of the present invention.

Prior to describing a method of manufacturing a secondary battery according to an embodiment of the present invention, a basic configuration of the secondary battery will be described. The term "secondary battery" used here refers to a battery that can be repeatedly charged and discharged. The "secondary battery" is not excessively limited by its name, and can include, for example, "an electric storage device". The term "planar view" used here refers to a state when an object is viewed from above or below along a thickness direction based on a stacking direction of an electrode material constituting the secondary battery. The term "cross-sectional view" used here refers to a state when viewed from a direction substantially perpendicular to the thickness direction based on the stacking direction of the electrode material constituting the secondary battery. The terms "vertical direction" and "horizontal direction" directly or indirectly used here correspond respectively to the vertical direction and the horizontal direction in the drawing. Unless otherwise stated, the same numerals and symbols denote the same members or portions or the same contents. In a preferred aspect, it can be grasped that a vertical downward direction (that is, a direction in which gravity acts) corresponds to a "downward direction", and the opposite direction corresponds to an "upward direction".

Basic Configuration of Secondary Battery

In the present invention, a secondary battery is provided. The term "secondary battery" used herein refers to a battery that can be repeatedly charged and discharged. Therefore, the secondary battery of the present invention is not excessively limited by its name, and, for example, "an electric storage device" and the like are also included in the subject of the present invention. The secondary battery is configured to have a structure in which an electrode assembly and an electrolyte are housed and sealed inside an exterior body. In the present invention, it is premised that the electrode assembly has a planar stacking structure in which a plurality of electrode constituting layers including a positive electrode, a negative electrode, and a separator are stacked upon each other. The exterior body may be in the form of a conductive hard case or a flexible case (such as a pouch). When the exterior body is in the form of a flexible case (such as a pouch), each of the plurality of positive electrodes is connected to a positive electrode external terminal via a positive electrode current collector lead. The positive electrode external terminal is fixed to the exterior body by a seal portion, and the seal portion prevents the electrolyte from leaking. Similarly, each of the plurality of negative electrodes is connected to a negative electrode external terminal via a negative electrode current collector lead. The negative electrode external terminal is fixed to the exterior body by a seal portion, and the seal portion prevents the electrolyte from leaking. Note that the present invention is not limited thereto, and the positive electrode current collector lead connected to each of the plurality of positive electrodes may be provided with the function of the positive electrode external terminal. On the other hand, the negative electrode current collector lead connected to each of the plurality of negative electrodes may be provided with the function of the negative electrode external terminal. When the exterior body is in the form of a conductive hard case, each of the plurality of positive electrodes is connected to the positive electrode external terminal via the positive electrode current collector lead. The positive electrode external terminal is fixed to the exterior body by a seal portion, and the seal portion prevents the electrolyte from leaking.

Figure 11:
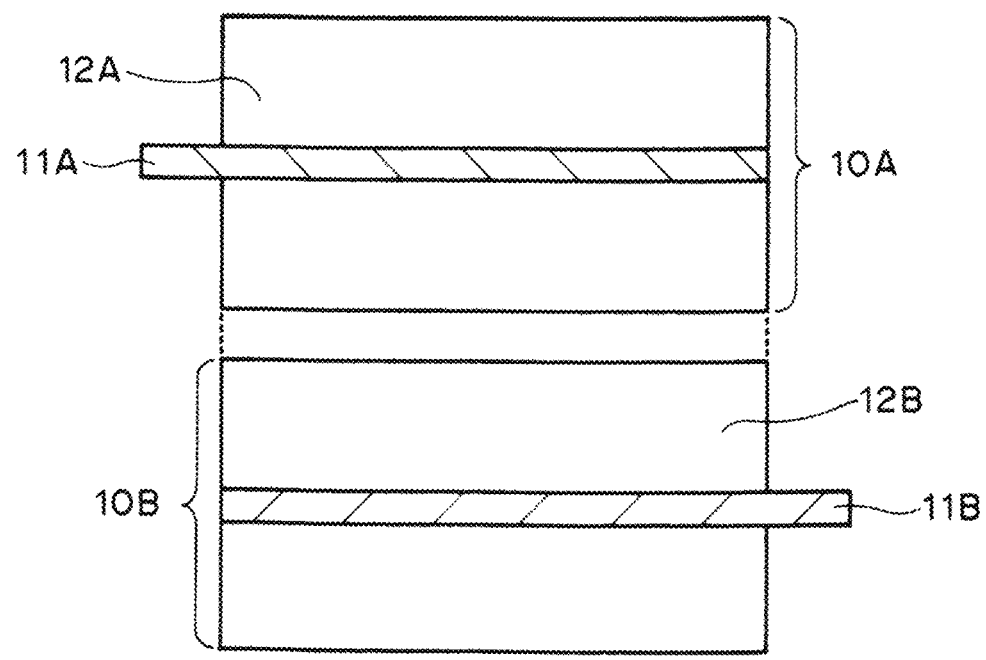
FIG. 11 is a cross-sectional view schematically showing a basic configuration of an electrode constituting layer.

A positive electrode 10A is configured by at least a positive electrode current collector 11A and a positive electrode material layer 12A (see FIG. 11), and the positive electrode material layer 12A is provided on at least one side of the positive electrode current collector 11A. A positive-electrode extended tab is positioned at a portion of the positive electrode current collector 11A where the positive electrode material layer 12A is not provided, that is, at an end of the positive electrode current collector 11A. The positive electrode material layer 12A contains a positive electrode active material as an electrode active material. A negative electrode 10B is configured by at least a negative electrode current collector 11B and a negative electrode material layer 12B (see FIG. 11), and the negative electrode material layer 12B is provided on at least one side of the negative electrode current collector 11B. A negative-electrode extended tab is positioned at a portion of the negative electrode current collector 11B where the negative electrode material layer 12B is not provided, that is, at an end of the negative electrode current collector 11B. The negative electrode material layer 12B contains a negative electrode active material as an electrode active material.

The positive electrode active material contained in the positive electrode material layer 12A and the negative electrode active material contained in the negative electrode material layer 12B are substances directly involved in the transfer of electrons in the secondary battery and are main substances of the positive and negative electrodes which are responsible for charging and discharging, namely a battery reaction. More specifically, ions are generated in the electrolyte by "the positive electrode active material contained in the positive electrode material layer 12A" and "the negative electrode active material contained in the negative electrode material layer 12B", and the ions move between the positive electrode 10A and the negative electrode 10B and the electrons are transferred, whereby charging and discharging are performed. The positive electrode material layer 12A and the negative electrode material layer 12B are particularly preferably layers capable of inserting and extracting lithium ions. In other words, a secondary battery is preferred in which lithium ions move between the positive electrode 10A and the negative electrode 10B through an electrolyte, thereby charging and discharging the battery. When lithium ions are involved in charging and discharging, the secondary battery corresponds to a so-called "lithium ion battery".

The positive electrode active material of the positive electrode material layer 12A is made of, for example, a granular material, and it is preferable that a binder be contained in the positive electrode material layer 12A in order to maintain a more sufficient contact between particles and the shape of the particles. Further, a conductive auxiliary agent may be contained in the positive electrode material layer 12A in order to facilitate transmission of electrons promoting the battery reaction. Similarly, when the negative electrode active material of the negative electrode material layer 12B is made of, for example, a granular material, a binder is preferably contained in order to maintain a more sufficient contact between particles and the shape of the particles, and a conductive auxiliary agent may be contained in the negative electrode material layer 12B in order to facilitate transmission of electrons promoting the battery reaction. As described above, since a plurality of components is contained, the positive electrode material layer 12A and the negative electrode material layer 12B can also be referred to as "positive electrode mixture layer" and "negative electrode mixture layer", respectively.

The positive electrode active material is preferably a material that contributes to insertion and extraction of lithium ions. In this respect, the positive electrode active material is preferably, for example, a lithium-containing composite oxide. More specifically, the positive electrode active material is preferably a lithium-transition metal composite oxide containing lithium and at least one transition metal selected from the group consisting of cobalt, nickel, manganese, and iron. That is, the positive electrode material layer 12A of the secondary battery preferably contains such a lithium-transition metal composite oxide as a positive electrode active material. Examples of the positive electrode active material may include lithium cobaltate, lithium nickelate, lithium manganate, lithium iron phosphate, or materials in which a part of the transition metal of these is substituted with another metal. Such a positive electrode active material may be contained singly or in combination of two or more. In a more preferred aspect, the positive electrode active material contained in the positive electrode material layer 12A is lithium cobaltate.

The binder which can be contained in the positive electrode material layer 12A is not particularly limited, but examples thereof include at least one selected from the group consisting of polyvinylidene fluoride, a vinylidene fluoride-hexafluoropropylene copolymer, a vinylidene fluoride-tetrafluoroethylene copolymer, polytetrafluoroethylene and the like. The conductive auxiliary agent which can be contained in the positive electrode material layer 12A is not particularly limited, but examples thereof include at least one selected from the group consisting of carbon black such as thermal black, furnace black, channel black, ketjen black, and acetylene black; carbon fibers such as graphite, carbon nanotube, and vapor-grown carbon fiber; metal powders such as copper, nickel, aluminum, and silver; polyphenylene derivatives, and the like. For example, the binder of the positive electrode material layer 12A may be polyvinylidene fluoride. Although it is merely an example, the conductive auxiliary agent of the positive electrode material layer 12A is carbon black. In addition, the binder and the conductive auxiliary agent of the positive electrode material layer 12A may be a combination of polyvinylidene fluoride and carbon black.

The negative electrode active material is preferably a material that contributes to insertion and extraction of lithium ions. In this respect, the negative electrode active material is preferably, for example, various carbon materials, oxides or lithium alloys.

Examples of various carbon materials of the negative electrode active material include graphite (natural graphite, artificial graphite), soft carbon, hard carbon, and diamond-like carbon. In particular, graphite is preferable because it has high electron conductivity and excellent adhesive properties to the negative electrode current collector 11B. Examples of the oxide of the negative electrode active material include at least one selected from the group consisting of silicon oxide, tin oxide, indium oxide, zinc oxide, lithium oxide and the like. The lithium alloy of the negative electrode active material may be any metal as long as the metal can be alloyed with lithium, and the lithium alloy may be, for example a binary, ternary or higher alloy of a metal such as Al, Si, Pb, Sn, In, Bi, Ag, Ba, Ca, Hg, Pd, Pt, Te, Zn or La and lithium. It is preferable that such an oxide be amorphous as its structural form. This is because degradation due to nonuniformity such as crystal grain boundaries or defects is hardly caused. Although it is merely an example, the negative electrode active material of the negative electrode material layer 12B may be artificial graphite.

The binder which can be contained in the negative electrode material layer 12B is not particularly limited, but examples thereof include at least one kind selected from the group consisting of styrene-butadiene rubber, polyacrylic acid, polyvinylidene fluoride, polyimide-based resin, and polyamideimide-based resin. For example, the binder contained in the negative electrode material layer 12B may be a styrene-butadiene rubber. The conductive auxiliary agent which can be contained in the negative electrode material layer 12B is not particularly limited, but examples thereof include at least one selected from the group consisting of carbon black such as thermal black, furnace black, channel black, ketjen black, and acetylene black; carbon fibers such as graphite, carbon nanotube, and vapor-grown carbon fiber; metal powders such as copper, nickel, aluminum, and silver; polyphenylene derivatives, and the like. It is to be noted that the negative electrode material layer 12B may contain a component caused by a thickener component (for example, carboxymethyl cellulose) used at the time of manufacturing the battery.

Although it is merely an example, the negative electrode active material and the binder in the negative electrode material layer 12B may be a combination of artificial graphite and styrene-butadiene rubber.

The positive electrode current collector 11A and the negative electrode current collector 11B used for the positive electrode 10A and the negative electrode 10B are members that contribute to the collection and supply of electrons generated in the active material by the battery reaction. Such a current collector may be a sheet-like metal member and may be in a porous or perforated form. For example, each of the current collectors may be a metal foil, a punching metal, a net, an expanded metal, or the like. The positive electrode current collector 11A used for the positive electrode 10A is preferably made of a metal foil containing at least one selected from the group consisting of aluminum, stainless steel, nickel and the like, and may be, for example, an aluminum foil. On the other hand, the negative electrode current collector 11B used for the negative electrode 10B is preferably made of a metal foil containing at least one selected from the group consisting of copper, stainless steel, nickel and the like, and may be, for example, a copper foil.

The separator 50 is a member provided from the viewpoints of the prevention of short circuit due to contact between the positive and negative electrodes and the holding of the electrolyte and the like. In other words, it can be said that the separator 50 is a member that passes ions while preventing electronic contact between the positive electrode 10A and the negative electrode 10B. Preferably, the separator 50 is a porous or microporous insulating member and has a film form due to its small thickness. Although it is merely an example, a microporous membrane made of polyolefin may be used as the separator. In this respect, the microporous membrane used as the separator 50 may contain, for example, only polyethylene (PE) or only polyethylene (PP) as polyolefin. Further, the separator 50 may be a laminate including "a microporous membrane made of PE" and "a microporous membrane made of PP". The surface of the separator 50 may be covered with an inorganic particle coating layer, and/or an adhesive layer. The surface of the separator may have adhesive properties.

The separator 50 is not particularly restricted by its name, and may be a solid electrolyte, a gel-like electrolyte, an insulating inorganic particle, or the like that has a similar function. From the viewpoint of further improving handling of the electrode, it is preferable that the separator 50 and the electrode (positive electrode 10A/negative electrode 10B) be adhered. The adhesion between the separator 50 and the electrode can be achieved by, for example, using an adhesive separator as the separator 50 or applying and/or thermocompression bonding an adhesive binder onto the electrode material layer (positive electrode material layer 12A/negative electrode material layer 12B). Examples of materials of the adhesive binder that provide adhesive properties to the separator 50 or the electrode material layer include polyvinylidene fluoride, vinylidene fluoride-hexafluoropropylene polymer, and acrylic resin. The thickness of the adhesive layer according to, for example, application of the adhesive binder may be 0.5 μm or more and 5 μm or less.

When the positive electrode 10A and the negative electrode 10B have a layer capable of inserting and extracting lithium ions, the electrolyte is preferably a "nonaqueous" electrolyte such as an organic electrolyte and/or an organic solvent (that is, that the electrolyte preferably serves as a nonaqueous electrolyte). In the electrolyte, metal ions released from the electrode (positive electrode 10A/negative electrode 10B) will be present, and the electrolyte will thus help the movement of the metal ions in the battery reaction.

The nonaqueous electrolyte is an electrolyte containing a solvent and a solute. As a specific solvent for the nonaqueous electrolyte, a solvent containing at least a carbonate is preferred. The carbonates may be cyclic carbonates and/or chain carbonates. Although not particularly limited, examples of the cyclic carbonates include at least one kind selected from the group consisting of propylene carbonate (PC), ethylene carbonate (EC), butylene carbonate (BC), and vinylene carbonate (VC). Examples of the chain carbonates include at least one kind selected from the group consisting of dimethyl carbonate (DMC), diethyl carbonate (DEC), ethyl methyl carbonate (EMC), and dipropyl carbonate (DPC). Although it is merely an example, a combination of cyclic carbonate and chain carbonate may be used as the nonaqueous electrolyte, and, for example, a mixture of ethylene carbonate and diethyl carbonate may be used. As a solute of a specific nonaqueous electrolyte, for example, a Li salt such as $LiPF_6$ and $LiBF_4$ is preferably used. As a solute of a specific nonaqueous electrolyte, for example, a Li salt such as $LiPF_6$ and/or $LiBF_4$ is preferably used.

As the positive electrode current collector lead and the negative electrode current collector lead, any current collector lead used in the field of secondary batteries can be used. Such a current collector lead may be formed of a material that can achieve electron transfer, and the current collector lead is formed of, for example, a conductive material such as aluminum, nickel, iron, copper, or stainless steel. The positive electrode current collector lead is preferably formed of aluminum, and the negative electrode current collector lead is preferably formed of nickel. The form of the positive electrode current collector lead and the negative electrode current collector lead is not particularly limited and may be, for example, a wire or a plate.

Any external terminal used in the field of secondary batteries can be used as the external terminal. Such an external terminal may be formed of a material that can achieve electron transfer, and the external terminal is usually formed of a conductive material such as aluminum, nickel, iron, copper, or stainless steel. An external terminal 5 may be electrically and directly connected to a substrate or may be electrically and indirectly connected to the substrate via another device. Note that the present invention is not limited thereto, and the positive electrode current collector lead connected to each of the plurality of positive electrodes may be provided with the function of the positive electrode external terminal. On the other hand, the negative electrode current collector lead connected to each of the plurality of negative electrodes may be provided with the function of the negative electrode external terminal.

As described above, the exterior body may be in the form of a conductive hard case or a flexible case (such as a pouch).

The conductive hard case is constituted of a main body portion and a lid portion. The main body portion is constituted of a bottom portion and a side surface portion which constitute a bottom surface of the exterior body. The main body portion and the lid portion are sealed after the electrode assembly, the electrolyte, the current collector lead, and the external terminal are housed. A sealing method is not particularly limited, and, for example, a laser irradiation method or the like is used. As a material that constitutes the main body portion and the lid portion, it is possible to use any material that can constitute a hard case type exterior body in the field of secondary batteries. The material may be any material as long as electron transfer can be achieved, and examples thereof include conductive materials such as aluminum, nickel, iron, copper, and stainless steel. The dimensions of the main body portion and the lid portion are determined mainly according to the dimension of the electrode assembly, and, for example, it is preferable that the electrode assembly have a dimension such that the movement (displacement) of the electrode assembly in the exterior body is prevented when the electrode assembly is housed. The movement of the electrode assembly is prevented, whereby the destruction of the electrode assembly is prevented and the safety of the secondary battery is improved.

The flexible case is configured by a flexible sheet. The flexible sheet only needs to have sufficient softness to achieve bending of the seal portion and is preferably a plastic sheet. The plastic sheet is a sheet having a characteristic that deformation by external force is maintained when the plastic sheet is removed after the external force is applied, and a so-called laminate film can be used, for example. A flexible pouch formed from a laminate film can be manufactured, for example, by superposing two laminate films and heat-sealing a peripheral edge portion thereof. As the laminate film, a film obtained by stacking a metal foil and a polymer film is generally used, and specific examples thereof include one having a three-layer structure including an outer layer polymer film, a metal foil, and an inner layer polymer film. The outer layer polymer film is for preventing permeation of moisture and the like and damage to the metal foil due to contact and the like, and polymers such as polyamide and polyester can be suitably used. The metal foil is for preventing permeation of moisture and gas, and foils of copper, aluminum, stainless steel, and the like can be suitably used. The inner layer polymer film serves to protect the metal foil from the electrolyte housed inside while also providing a melt seal during heat sealing. For example, a polyolefin or acid-modified polyolefin can be suitably used.

Secondary Battery of the Present Invention

In consideration of the basic configuration of the secondary battery according to an embodiment of the present invention, the characteristic part of the secondary battery according to an embodiment of the present invention will be described below.

The inventor of the present application has keenly studied measures to suppress warpage stress in an outermost layer electrode in which the electrode material layer is provided on one main surface of the current collector. As a result, the present invention has been made.

Hereinafter, prior to describing the characteristic parts of the present invention, definition of terms used in the present specification will be made. The term "partial electrode assembly" used here refers to a previous stage of a finally obtained electrode assembly (finished product) including an outermost layer electrode and corresponds to a precursor of the electrode assembly. An "overlapping region of the outermost layer electrode" used here refers to a predetermined portion of the outermost layer electrode where a two-layer structure is formed by winding the outermost layer electrode around the partial electrode assembly more than one turn. An "outer portion of the overlapping region of the outermost layer electrode" used here refers to a portion located at an outer side of a predetermined portion of the outermost layer electrode forming a two-layer structure in cross-sectional view and exposed to a main surface of the electrode assembly. An "inner portion of the overlapping region of the outermost layer electrode" used here refers to a portion located at an inner side of a predetermined portion of the outermost layer electrode forming a two-layer structure in cross-sectional view and not exposed to the main surface of the electrode assembly. The "separator having an extending portion" used here refers to a separator that is more elongate than a separator provided on a main surface of the electrode material layer of the outermost layer electrode and is configured to extend from an end of the outermost layer electrode. The term "double-sided electrode" used here refers to one positioned in an inner region of the electrode assembly and including the electrode material layers provided on both main surfaces of the current collector. The term "single-sided electrode" used here refers to one positioned in an outermost layer region of the electrode assembly and including the electrode material layer provided (only) on one main surface of the current collector.

The present invention is devised from a different point of view from a conventional electrode assembly having a planar stacking structure in which a plurality of electrode constituting layers in which a separator is disposed between electrodes are stacked. Specifically, the present invention is devised based on the technical idea of winding an outermost layer electrode 10 (single-sided electrode) around a partial electrode assembly 90. In order to realize such a technical idea, the present invention is characterized in that the outermost layer electrode 10 in which an electrode material layer 12 is provided (only) on one main surface of a current collector 11 surrounds the partial electrode assembly 90 along at least a portion of a contour of the partial electrode assembly 90 as a constituent of a finally obtained electrode assembly 100 in cross-sectional view (see FIG. 1). Such a characteristic is advantageous in that it is not an extension of common technical knowledge of those skilled in the art that the planar outermost layer electrode 10 is stacked in the electrode assembly 100 of the planar stacking structure type.

In the present invention, the outermost layer electrode 10 surrounds the partial electrode assembly 90 along at least a portion of the contour of the partial electrode assembly 90 in a cross-sectional view thereof. Since the partial electrode assembly 90 has a substantially rectangular shape in cross-sectional view, in order for the partial electrode assembly 90 having a substantially rectangular shape in cross-sectional view to be "surrounded" by the outermost layer electrode, the outermost layer electrode 10 needs to be located so as to straddle at least two bent portions of the partial electrode assembly 90. When the outermost layer electrode 10 straddles at least two bent portions of the partial electrode assembly 90, tensile stress is easily applied to the outermost layer electrode 10 due to the shape thereof. That is, a predetermined tension can be applied to the outermost layer electrode 10. The warpage stress that may occur during pressure treatment for obtaining the electrode 10' positioned at the outermost layer mentioned above is specifically stress for which, due to the fact that the electrode material layer 12' stretches relatively greater than the current collector 11', a main surface of the electrode material layer 12' may become an outer curved surface, and the main surface of the current collector 11' may become an inner curved surface (see the lower left portion in FIG. 12). In this regard, in an embodiment of the present invention, since a predetermined tension can be applied to the outermost layer electrode 10, a predetermined form (shape) of the outermost layer electrode 10 can be maintained by the tension. Thereby, it is possible to suitably suppress occurrence of warpage stress where, in the outermost layer electrode 10, a main surface of the electrode material layer 12 may become an outer curved surface, and the main surface of the current collector 11 may become an inner curved surface. That is, in an embodiment of the present invention, it is possible to suitably suppress occurrence of warpage in the outermost layer electrode 10 due to the warpage stress. This means that it is possible to suppress that the outermost layer electrode 10 attempts to partially separate from the partial electrode assembly 90 in cross-sectional view. Thereby, the outermost layer electrode 10 can be suitably functioned as a constituent of the electrode assembly 100. As a result, a secondary battery including the electrode assembly 100 as a whole can suitably exhibit desired battery characteristics.

Since the warpage stress which may be generated in the outermost layer electrode 10 can be suppressed as described above, it is not necessary to take measures to suppress the warpage stress that has become conventional common technical knowledge of those skilled in the art. Specifically, since the warpage stress may be generated by pressure treatment for obtaining a desired density when the outermost layer electrode is formed, in order to suppress the warpage stress according to conventional common technical knowledge of those skilled in the art, it may be necessary to make the thickness of the current collector of the outermost layer electrode relatively larger than the thickness of the current collector of a double-sided electrode (provided with the electrode material layers on both main surfaces of the current collector) provided in the inner region of the electrode assembly. Thus, an energy density of the battery may be reduced due to the increase in thickness of the current collector of the outermost layer electrode. In this regard, in an embodiment of the present invention, since the warpage stress that may be generated in the outermost layer electrode 10 can be suppressed by another means as described above, it is not necessary to make the thickness of the current collector 11 of the outermost layer electrode 10 relatively larger than the double-sided electrode provided in the inner region of the electrode assembly. Thus, a difference between the thickness of the current collector 11 of the outermost layer electrode 10 and the thickness of the current collectors of the other double-sided electrodes can be made small, that is, substantially the same. In order to suppress the warpage stress according to conventional common technical knowledge of those skilled in the art, it is necessary to relatively reduce a force (pressure) for pressuring the outermost layer electrode. Thus, the energy density of the battery may be reduced due to the relatively small pressure applied to the outermost layer electrode. In this regard, in an embodiment of the present invention, since the warpage stress that may be generated in the outermost layer electrode 10 can be suppressed by another means as described above, it is not necessary to make the pressure at the time of formation of the outermost layer electrode (single-sided electrode) relatively smaller than the pressure at the time of formation of the double-sided electrode provided in the inner region of the electrode assembly. That is, it is possible to reduce a difference between the pressure applied when the double-sided electrode provided in the inner region of the electrode assembly is formed and the pressure applied when the outermost layer electrode 10 (single-sided electrode) is formed. Therefore, a difference between the density of the double-sided electrode provided in the inner region of the electrode assembly obtained by pressure treatment and the density of the outermost layer electrode 10 provided in the outermost layer region of the electrode assembly can be made small, that is, substantially the same. From the above, in an embodiment of the present invention, it is not necessary to increase the thickness of the current collector 11 of the outermost layer electrode 10 and/or to reduce the pressure applied to the outermost layer electrode 10, and therefore, this embodiment is also advantageous in that it is possible to suppress the reduction in the energy density of the battery due to this.

The secondary battery according to an embodiment of the present invention preferably adopts the following aspects.

In one aspect, preferably, the separator 50 with an adhesive layer, which is in contact with the outermost layer electrode 10 and the partial electrode assembly 90, is positioned between the outermost layer electrode 10 and the partial electrode assembly 90 in the cross-sectional view (see bottom of FIG. 1).

In the above embodiment, although the technical effect provided by surrounding (winding) of the outermost layer electrode 10 with respect to the partial electrode assembly 90 has been described, as shown in detail in the bottom of FIG. 1, from the viewpoint of preventing a short circuit due to contact of the positive and negative electrodes, the separator 50 is positioned between the outermost layer electrode 10 and the partial electrode assembly 90 in the cross-sectional view. The separator 50 is provided to be in contact with both the outermost layer electrode 10 and the partial electrode assembly 90, and in the separator 50, adhesive layers having an adhesive function are provided on both main surfaces thereof (not shown). That is, the separator 50 is "the separator 50 with an adhesive layer." Specifically, the adhesive layer provided on one main surface of the separator 50 is adhered to the electrode material layer 12 of the outermost layer electrode 10. On the other hand, the adhesive layer provided on the other main surface of the separator 50 is adhered to the partial electrode assembly 90. According to the above, it becomes possible to suitably integrate the outermost layer electrode 10 and the partial electrode assembly 90 with the "separator 50 with an adhesive layer" interposed therebetween.

Figure 2:
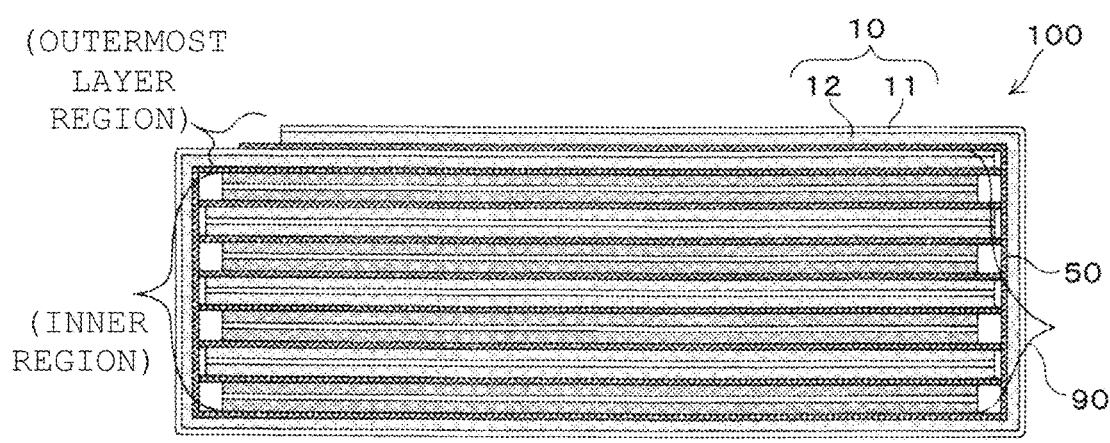
FIG. 2 is a detailed cross-sectional view of the electrode assembly of the secondary battery according to the embodiment of the present invention.

In one aspect, preferably, in cross-sectional view, the outermost layer electrode 10 surrounds the partial electrode assembly 90 along contours of both main surfaces 90α of the partial electrode assembly 90 and at least one side surface 90β of the partial electrode assembly 90 continuing to the both main surfaces 90α (see FIGS. 1 and 2).

In order to apply tension to the outermost layer electrode 10 as described above, the outermost layer electrode 10 needs to straddle at least two bent portions of the partial electrode assembly 90. The straddling can be realized when, in cross-sectional view, the outermost layer electrode 10 surrounds the partial electrode assembly 90 along the contour of both main surfaces 90α of at least the partial electrode assembly 90 and at least one side surface 90β of the partial electrode assembly 90 continuing to the both main surfaces 90α. According to the above, the outermost layer electrode 10 can be suitably "pulled", whereby tension can be applied to the outermost layer electrode 10. Since a predetermined form (shape) of the outermost layer electrode 10 can be maintained by the tension, it becomes possible to suppress generation of the warpage stress which may be generated in the outermost layer electrode 10 due to that.

Figure 4:
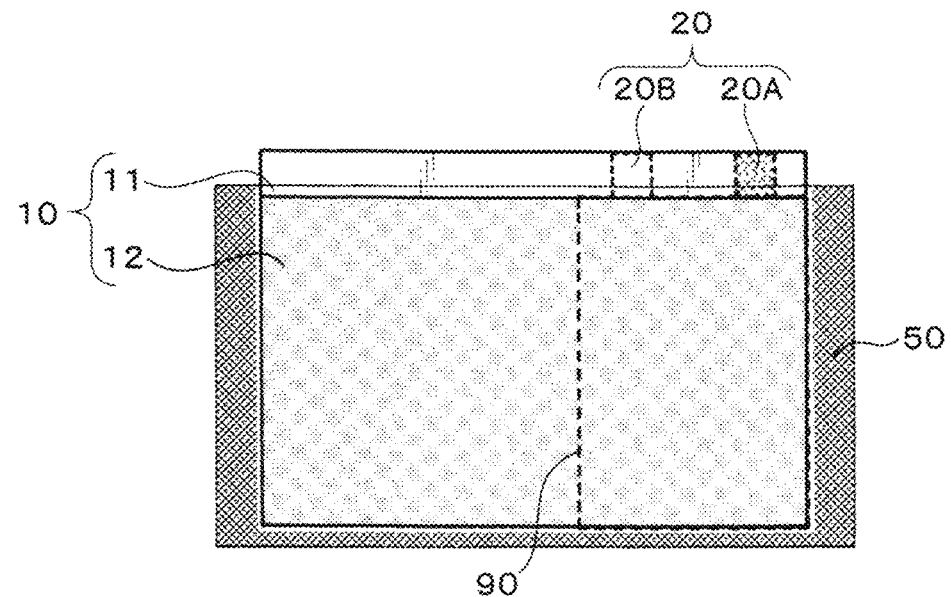
FIG. 4 is a schematic view of an electrode assembly of a secondary battery according to another embodiment of the present invention.
Figure 4:
Figure 4:
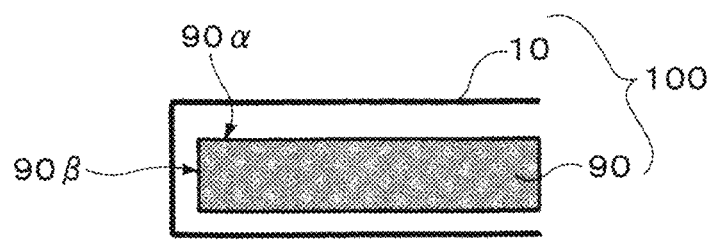
Figure 4:
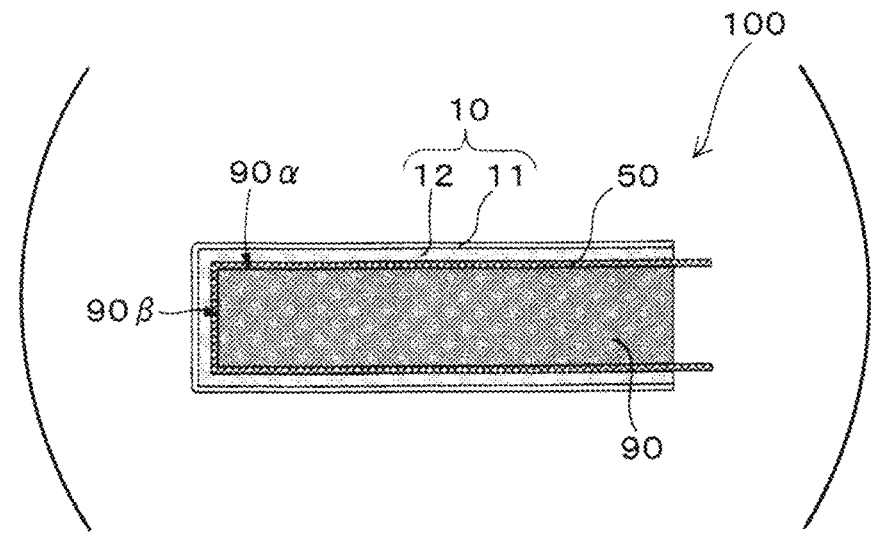

FIGS. 1 and 2 show an aspect in which, in cross-sectional view, the outermost layer electrode 10 surrounds the partial electrode assembly 90 along the entire contour of both main surfaces 90α of the partial electrode assembly 90 and both side surfaces 90β of the partial electrode assembly 90 continuing to the main surfaces 90α. That is, FIGS. 1 and 2 show an aspect in which the partial electrode assembly 90 is surrounded such that the outermost layer electrode 10 straddles all bent portions of the partial electrode assembly 90 in cross-sectional view. However, the present invention is not limited to this aspect as long as the outermost layer electrode 10 straddles at least two bent portions of the partial electrode assembly 90. For example, in cross-sectional view, the outermost layer electrode 10 may surround the partial electrode assembly 90 along contours of both main surfaces 90α of the partial electrode assembly 90 and only one of the side surfaces 90β of the partial electrode assembly 90 continuing to the both main surfaces 90α (see FIG. 4).

Figure 5:
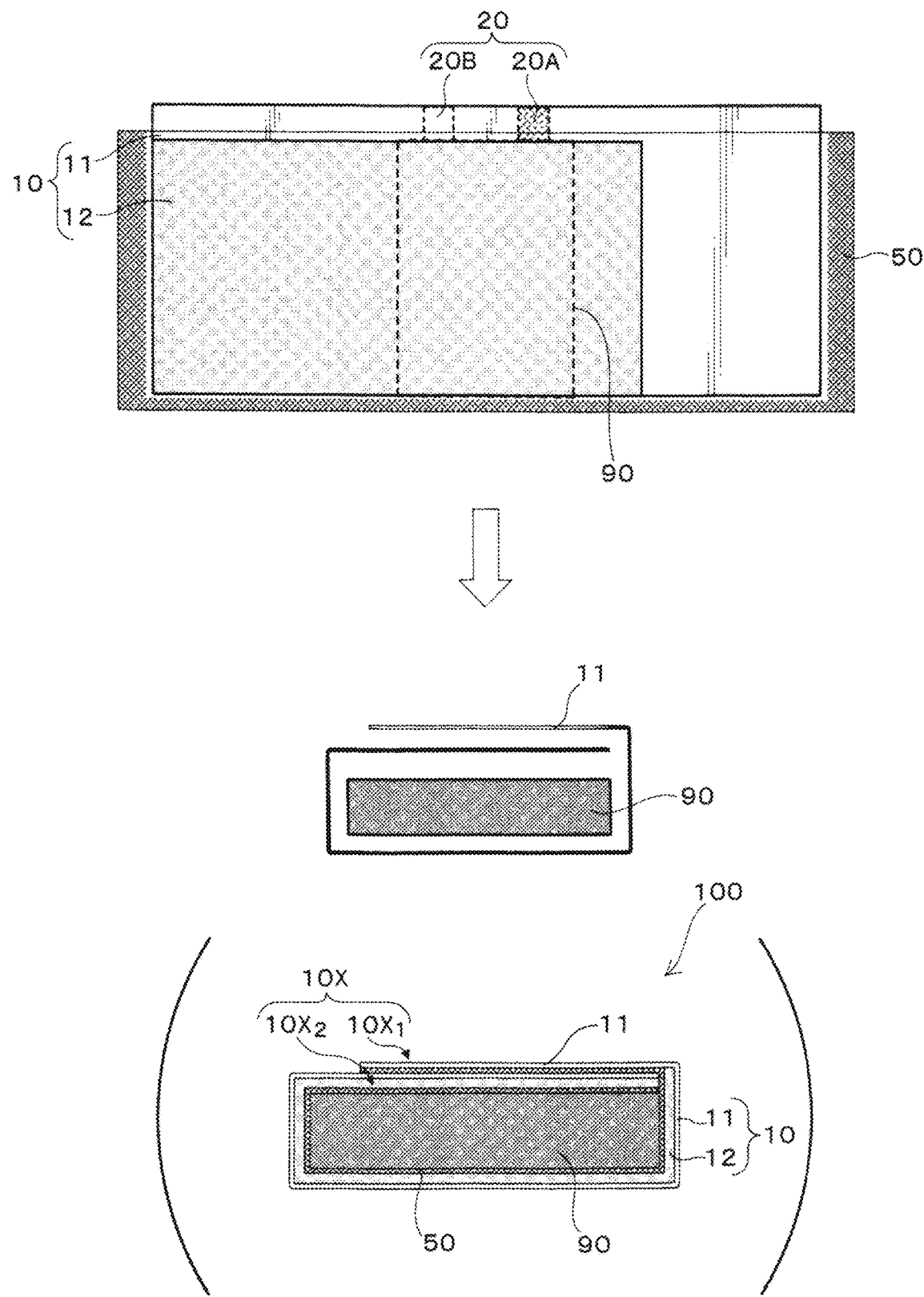
FIG. 5 is a schematic view of an electrode assembly of a secondary battery according to still another embodiment of the present invention.

In one aspect, preferably, the outermost layer electrode 10 has overlapping regions 10X provided so as to overlap with each other in cross-sectional view, and only the current collector 11 is provided to an outer portion 10X₁ of the overlapping region 10X of the outermost layer electrode 10 in cross-sectional view (see FIG. 5).

In the present aspect, in the overlapping region 10X of the outermost layer electrode 10, the outer portion 10X₁ and an inner portion 10X₂ of the outermost layer electrode 10 are in a stacked state in cross-sectional view. In the stacked state, when only the current collector 11 is provided to the outer portion 10X₁ of the overlapping region 10X of the outermost layer electrode 10 in cross-sectional view, due to absence of the electrode material layer 12 in the outer portion 10X₁ of the overlapping region 10X of the outermost layer electrode 10, even if a conductive foreign matter is mixed in the battery to cause an internal short circuit, the short circuit condition can be terminated with only slight heat generation. That is, it is possible to suitably suppress flowing of a short circuit current to an inner region of the electrode assembly 100. As a result, the safety of the battery can be maintained and improved.

Figure 6:
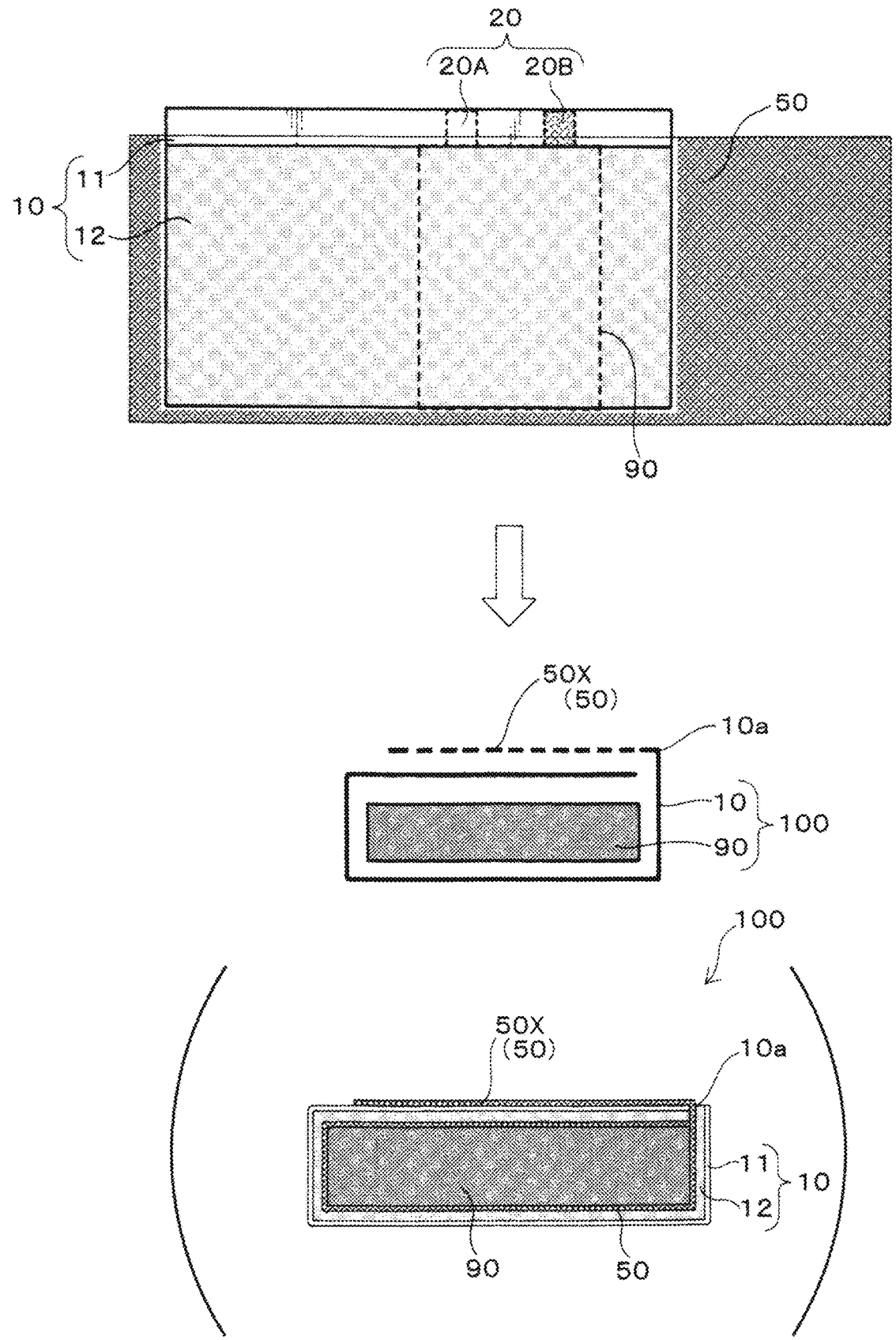
FIG. 6 is a schematic view of an electrode assembly of a secondary battery according to still another embodiment of the present invention.

In one aspect, preferably, the separator 50 is more elongate than the outermost layer electrode 10 and includes an extending portion 50X extending from an end 10a of the outermost layer electrode 10, and the extending portion 50X of the separator 50 is fixed to the outermost layer electrode 10 located inside the separator 50 in cross-sectional view (see FIG. 6).

In the present aspect, it is premised that the separator 50 is more elongate than the outermost layer electrode 10 and includes the extending portion 50X extending from the end 10a of the outermost layer electrode 10. The separator 50 is usually provided from the viewpoint of preventing a short circuit due to contact of the positive and negative electrodes, and in the present aspect, compared with the case where the outermost layer electrode 10 has overlapping regions overlapping with each other in cross-sectional view (see FIG. 1), only the separator 50 is provided without providing the current collector 11 and the electrode material layer 12 at a position corresponding to the outer portion of the overlapping region of the outermost layer electrode 10. Thereby, as compared with a case where the current collector 11 and the electrode material layer 12 are provided also to the outer portion of the overlapping region of the outermost layer electrode 10 with the separator 50 interposed therebetween, due to absence of the current collector 11 and the electrode material layer 12, the thicknesses of the current collector 11 and the electrode material layer 12 in the overlapping region of the outermost layer electrode 10 can be relatively reduced. As a result, it is possible to suppress the reduction in the energy density of the battery due to the thickness reduction of the current collector 11 and the electrode material layer 12.

In one aspect, preferably, the outermost layer electrode 10 in a portion facing the side surface 90β of the partial electrode assembly 90 has a single-sided electrode structure in cross-sectional view, and the outermost layer electrode 10 is a negative electrode (see FIG. 1).

In the present aspect, since the outermost layer electrode 10 in the portion facing the side surface 90β of the partial electrode assembly 90 has the single-sided electrode structure in cross-sectional view, the electrode material layer 11 is positioned also to the portion facing the side surface 90β of the partial electrode assembly 90. When a negative electrode is used as the outermost layer electrode 10, specifically, when a negative electrode material layer is used as the electrode material layer 11, the negative electrode material layer can function as a layer capable of accepting lithium ions, so that lithium ions which can move in a side surface region of the partial electrode assembly 90 can be suitably accepted. Therefore, deposition of lithium on a negative electrode end of the partial electrode assembly 90 due to lithium ion movement can be suitably suppressed. Accordingly, as a result of such suppression of lithium deposition, the safety of the battery can be improved.

Figure 7:
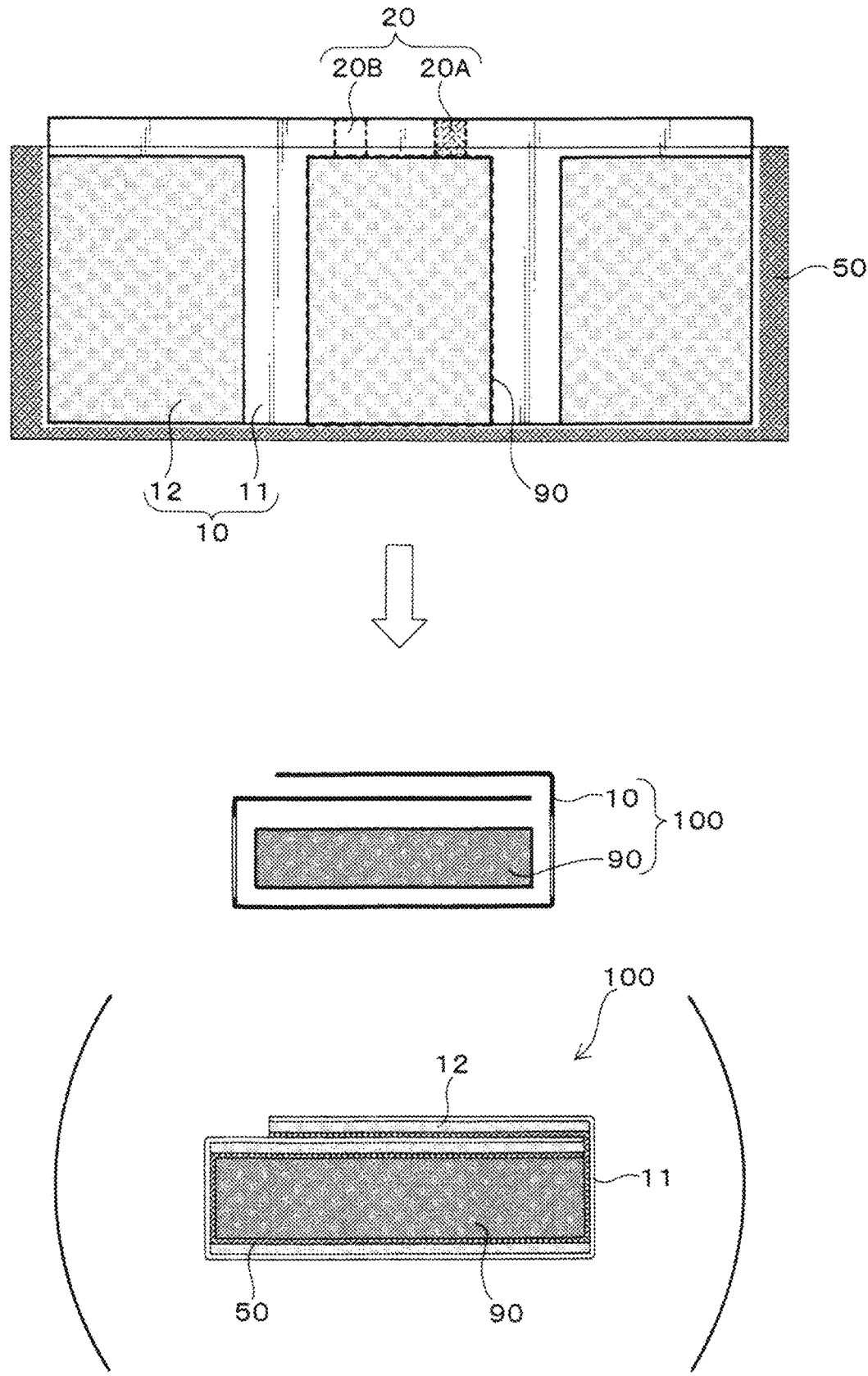
FIG. 7 is a schematic view of an electrode assembly of a secondary battery according to still another embodiment of the present invention.

Note that the present invention is not limited thereto, and in one aspect, the outermost layer electrode 10 in the portion facing the side surface 90β of the partial electrode assembly 90 may have only the current collector 11 in cross-sectional view (see FIG. 7).

In this case, the electrode material layer 12 does not exist in the outermost layer electrode 10 in the portion facing the side surface 90β of the partial electrode assembly 90. Thus, as compared with the case where the outermost layer electrode 10 includes the electrode material layer 12, the width dimension of the electrode assembly 100 finally obtained can be relatively reduced due to absence of the electrode material layer 12. Thus, the size of the secondary battery including the electrode assembly 100 can be relatively reduced.

When the outermost layer electrode 10 is used as a positive electrode, the positive electrode material layer does not substantially function as a layer capable of accepting lithium ions, and hence it is difficult to suppress the deposition of lithium on the negative electrode end of the partial electrode assembly 90 due to lithium ions which can move in the side surface region of the partial electrode assembly 90. Thus, when the outermost layer electrode 10 is used as a positive electrode, the outermost layer electrode 10 in the portion facing the side surface 90β of the partial electrode assembly 90 preferably has only the current collector 11 in cross-sectional view.

Figure 8:
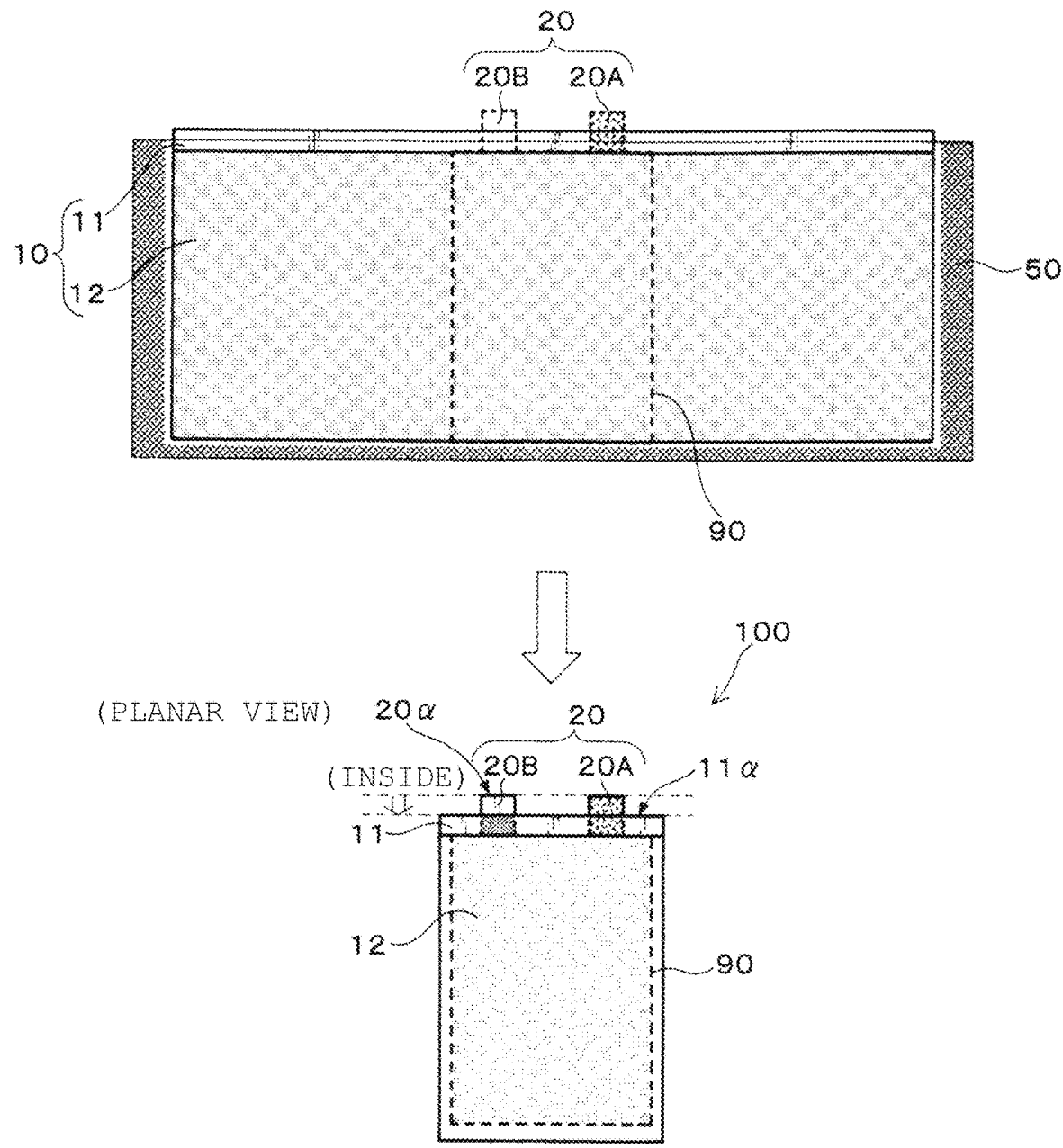
FIG. 8 is a schematic view of an electrode assembly of a secondary battery according to still another embodiment of the present invention.

In one aspect, preferably, the current collector 11 of the outermost layer electrode 10 is positioned so as to extend over only a portion of a tab 20 (positive electrode tab 20A, negative electrode tab 20B) of a double-sided electrode of the partial electrode assembly 90 in a planar view thereof (see FIG. 8).

In the present aspect, the current collector 11 of the outermost layer electrode 10 is positioned inside an end 20α of the tab 20 of the partial electrode assembly 90 in the planar view. The "end 20α of the tab 20" used here refers to a projecting end portion located on the outermost side of the extended tab 20 in the planar view. Due to the inner arrangement of the current collector 11 of the outermost layer electrode 10, the extended tab 20 provided to the partial electrode assembly 90 can be more easily exposed compared to a case where an end of the current collector 11 is substantially flush with the end 20α of the extended tab 20 provided to the partial electrode assembly 90 in planar view due to this. Thus, a portion of the current collector 11 exposed at an end of the outermost layer electrode 10 can be suitably and easily welded to the extended tab 20. Such a suitable welding can ultimately contribute to a suitable electrical connection between an extended portion (welded portion) and the external terminal via the lead. For example, when a negative electrode is used as the outermost layer electrode 10, the positive electrode tab 20A of the partial electrode assembly 90 is preferably protected with a tape from the viewpoint of preventing a short circuit due to the fact that a portion of the negative electrode current collector and the positive electrode tab face each other in planar view.

Figure 9:
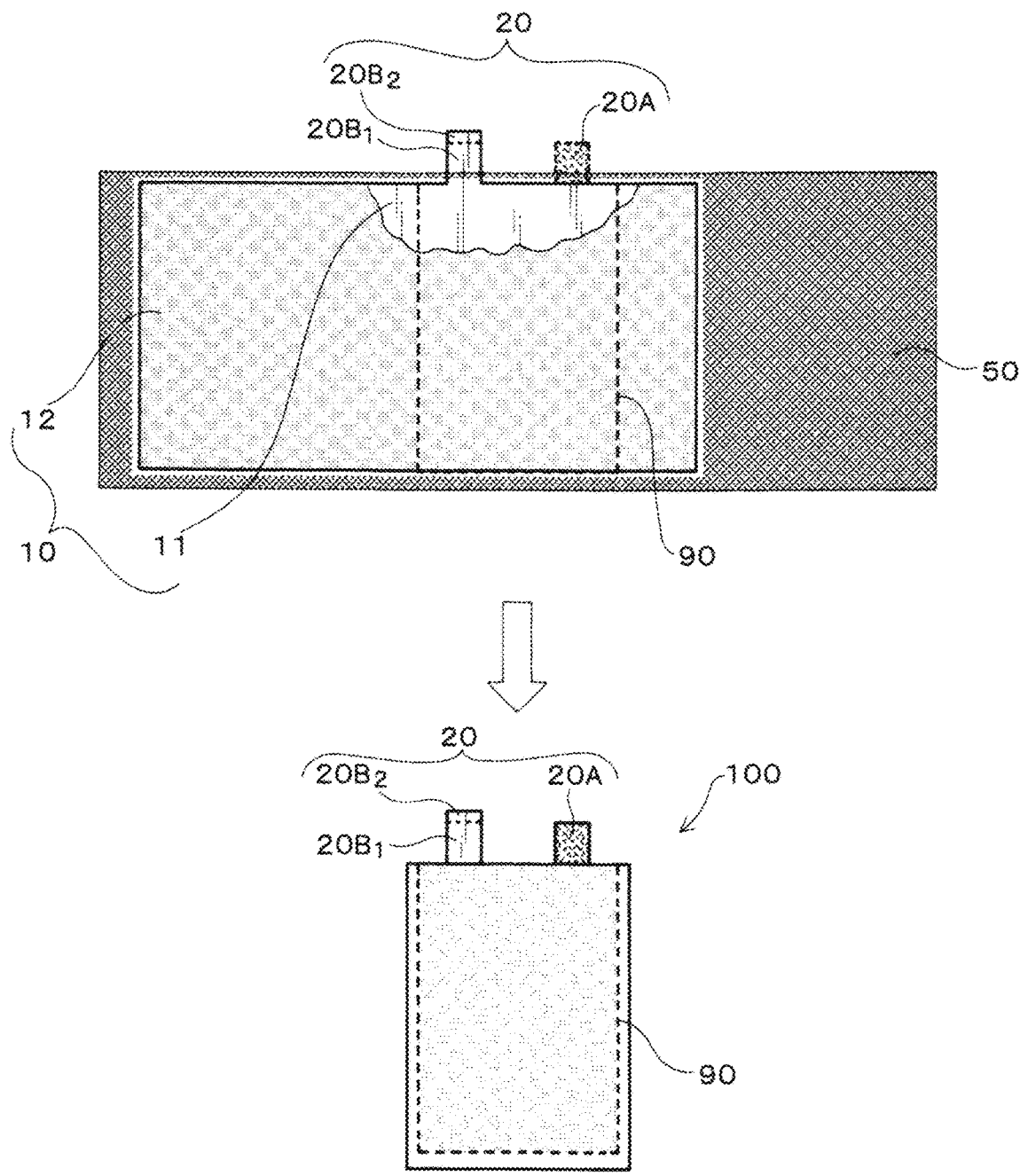
FIG. 9 is a schematic view of an electrode assembly of a secondary battery according to still another embodiment of the present invention.

In one aspect, preferably, the outermost layer electrode 10 has a tab, and only the tab of the outermost layer electrode 10 is positioned so as to locally overlap with the tab of the partial electrode assembly 90 in planar view (see FIG. 9).

In the above embodiment, it is assumed that the shape of the outermost layer electrode 10 wound around the partial electrode assembly 90 with the separator 50 interposed therebetween is substantially rectangular before winding. In this case, for example, when a negative electrode is used as the outermost layer electrode, in the winding state of the outermost layer electrode 10 around the partial electrode assembly 90, a short circuit may occur due to the fact that the positive electrode tab 20A of the partial electrode assembly 90 and a portion of a negative-electrode-side current collector face each other in planar view. Thus, in the present aspect, for example, when a negative electrode is used as the outermost layer electrode, from the viewpoint of preventing the short circuit, preferably the outermost layer electrode 10 is provided with a negative electrode tab $20B_1$, and only the negative electrode tab $20B_1$ is positioned so as to locally overlap with a negative electrode tab $20B_2$ of the partial electrode assembly 90 in planar view. Thereby, it can be avoided that after winding, the positive electrode tab 20A of the partial electrode assembly 90 and a portion of the negative-electrode-side current collector face each other in planar view. By avoiding the mutually facing state, it is possible to avoid a short circuit due to the fact that the positive electrode tab 20A of the partial electrode assembly 90 and a portion of the negative-electrode-side current collector face each other in planar view. Therefore, as a result of avoiding the occurrence of the short circuit, the safety of the battery can be improved.

Figure 10:
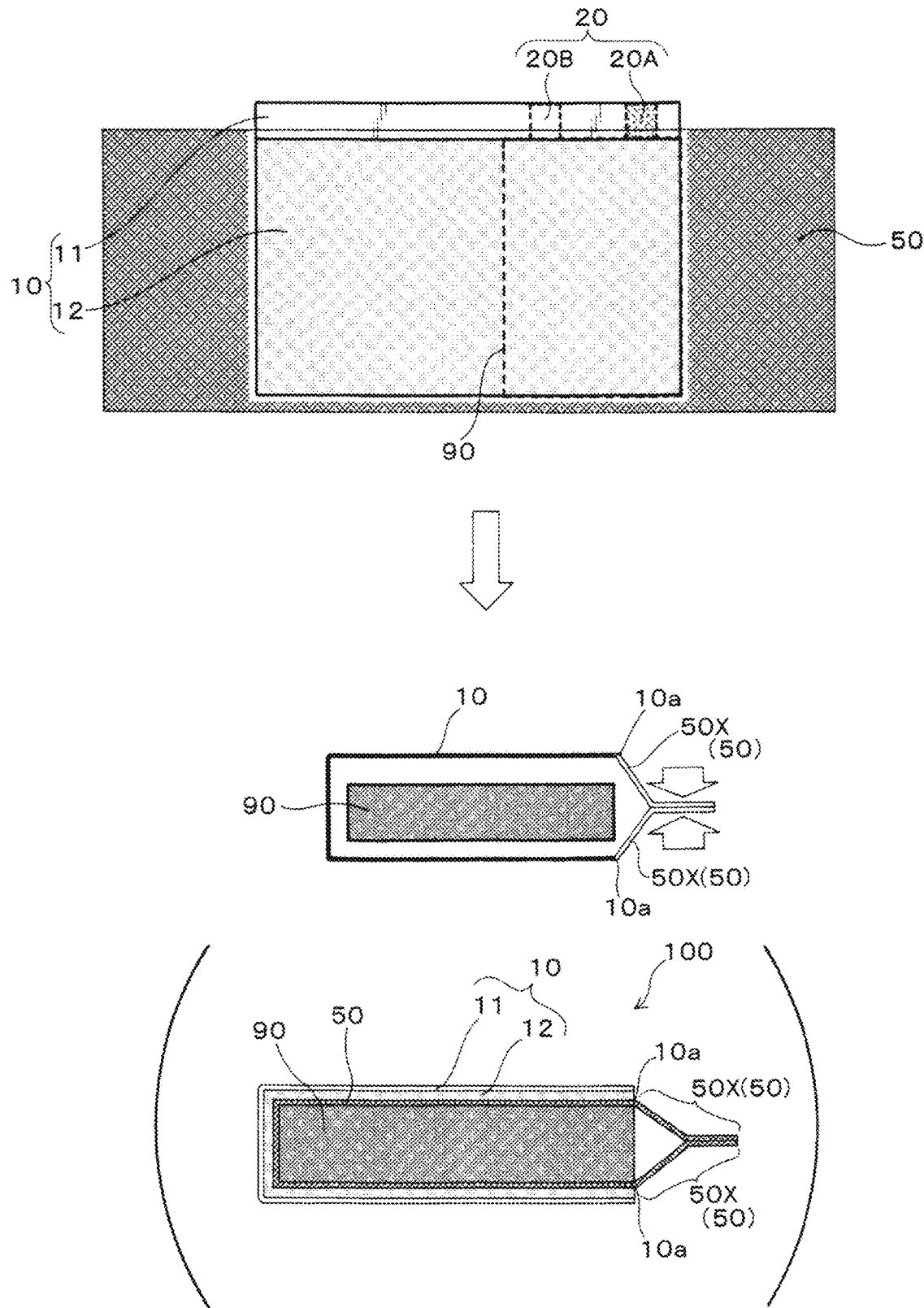
FIG. 10 is a schematic view of an electrode assembly of a secondary battery according to still another embodiment of the present invention.

In one aspect, preferably, the separator 50 is more elongate than the outermost layer electrode 10 and includes the extending portions 50X extending from both ends 10a of the outermost layer electrode 10, and the extending portions 50X of the separators 50 are connected to each other (see FIG. 10).

In the present aspect, it is premised that the separator 50 is more elongate than the outermost layer electrode 10 and includes the extending portion 50X extending from both ends 10a of the outermost layer electrode 10. In the present aspect, a portion of the partial electrode assembly 90 is surrounded by the outermost layer electrode 10 in cross-sectional view, and the remaining portion of the partial electrode assembly 90 is surrounded only by the extending portion 50X of the separator 50. That is, the present aspect is characterized in that only the separator 50 is positioned at a predetermined position of the contour of the partial electrode assembly 90. This means that the current collector 11 and the electrode material layer 12 do not exist at predetermined positions of the contour of the partial electrode assembly 90.

From the above, in the present aspect, compared to a case where the outermost layer electrode 10 including the current collector 11 and the electrode material layer 12 is provided along the entire contour of the partial electrode assembly 90, the thicknesses of the current collector 11 and the electrode material layer 12 can be relatively reduced at a portion where the current collector 11 and the electrode material layer 12 do not exist and only the separator 50 is provided. As a result, it is possible to improve the energy density of the battery due to the thickness reduction of the current collector 11 and the electrode material layer 12.

In one aspect, preferably, a portion of the current collector 11 of the outermost layer electrode 10 is exposed, and the portion of the exposed current collector 11 is positioned outside the separator 50 and the electrode material layer 12 in planar view (see the top of FIG. 1, etc.).

The present invention is characterized in that the outermost layer electrode 10 surrounds the partial electrode assembly 90 in cross-sectional view. However, both the outermost layer electrode 10 and the partial electrode assembly 90 are constituents of the electrode assembly 100. Thus, in order to allow the electrode assembly 100 to function suitably as a whole, the tab 20 of the double-sided electrode in the partial electrode assembly 90 and a portion of the current collector 11 of the outermost layer electrode 10 need to be electrically connectable. That is, the tab 20 of the double-sided electrode in the partial electrode assembly 90 and a portion of the current collector 11 of the outermost layer electrode 10 need to be arranged to face each other in planar view. Thus, it is necessary to expose a portion of the current collector 11 of the outermost layer electrode 10 in planar view. In view of this point, in the present aspect, preferably, a portion of the exposed current collector 11 is positioned outside the separator 50 and the electrode material layer 12 in planar view. Thereby, it becomes possible to make a portion of the current collector 11 and the tab 20 of the double-sided electrode in the partial electrode assembly 90 suitably face each other in planar view. Therefore, the tab 20 of the double-sided electrode in the partial electrode assembly 90 and a portion of the exposed current collector 11 of the outermost layer electrode 10 become electrically suitably connectable, and as a result, the electrode assembly 100 can be suitably functioned as a whole.

Method of Manufacturing Secondary Battery of the Present Invention

Hereinafter, a method of manufacturing a secondary battery according to an embodiment of the present invention will be described.

The manufacturing method of the present invention is devised from a different point of view from a conventional method of stacking a plurality of electrode constituting layers, obtained by disposing a separator between electrodes, to form an electrode assembly having a planar stacking structure. Specifically, the present invention has the technical idea of winding the outermost layer electrode 10, obtained by providing the electrode material layer 12 (only) on one main surface of the current collector 11, around the partial electrode assembly 90 along at least a portion of the contour of the partial electrode assembly 90 in cross-sectional view. That is, such a technical idea is advantageous in that it is not an extension of conventional common technical knowledge of those skilled in the art that the electrode assembly is obtained by stacking the electrodes including the outermost layer electrode.

As described above, the technical idea of the present invention is that the partial electrode assembly 90 is surrounded using the outermost layer electrode 10 along at least a portion of the contour of the partial electrode assembly 90 in cross-sectional view. That is, the technical idea of the present invention is to wind the outermost layer electrode 10 around the partial electrode assembly 90 (see FIGS. 3(*ii*) and (*iii*)). Since the partial electrode assembly 90 has a substantially rectangular shape in cross-sectional view, in order for the partial electrode assembly 90 having a substantially rectangular shape in cross-sectional view to be "surrounded" by the outermost layer electrode, the outermost layer electrode 10 needs to be located so as to straddle at least two bent portions of the partial electrode assembly 90. When the outermost layer electrode 10 straddles at least two bent portions of the partial electrode assembly 90, tensile stress is easily applied to the outermost layer electrode 10 due to the shape thereof. Therefore, a predetermined tension can be applied to the outermost layer electrode 10. As described above, the warpage stress that may occur during pressure treatment for obtaining the electrode 10' positioned at the outermost layer is specifically stress for which, due to the fact that the electrode material layer 12' stretches relatively greater than the current collector 11', a main surface of the electrode material layer 12' may become an outer curved surface, and the main surface of the current collector 11' may become an inner curved surface (see the lower left portion in FIG. 12). In this regard, in the manufacturing method according to an embodiment of the present invention, since a predetermined tension can be applied to the outermost layer electrode 10, a predetermined form (shape) of the outermost layer electrode 10 can be maintained by the tension. Thereby, it is possible to suitably suppress occurrence of the warpage stress for which in the outermost layer electrode 10, the main surface of the electrode material layer 12 may become an outer curved surface, and the main surface of the current collector 11 may become an inner curved surface. That is, it is possible to suitably suppress occurrence of warpage in the outermost layer electrode 10 due to the warpage stress. This means that it is possible to suppress that the outermost layer electrode 10 attempts to partially separate from the partial electrode assembly 90 in cross-sectional view.

Specifically, the electrode assembly 100 can be obtained mainly through the following steps.

Figure 3:
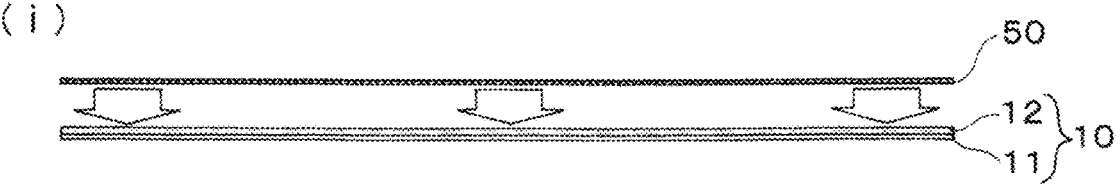
FIG. 3 is a schematic view showing a manufacturing flow of the electrode assembly of the secondary battery according to the embodiment of the present invention.
Figure 3:
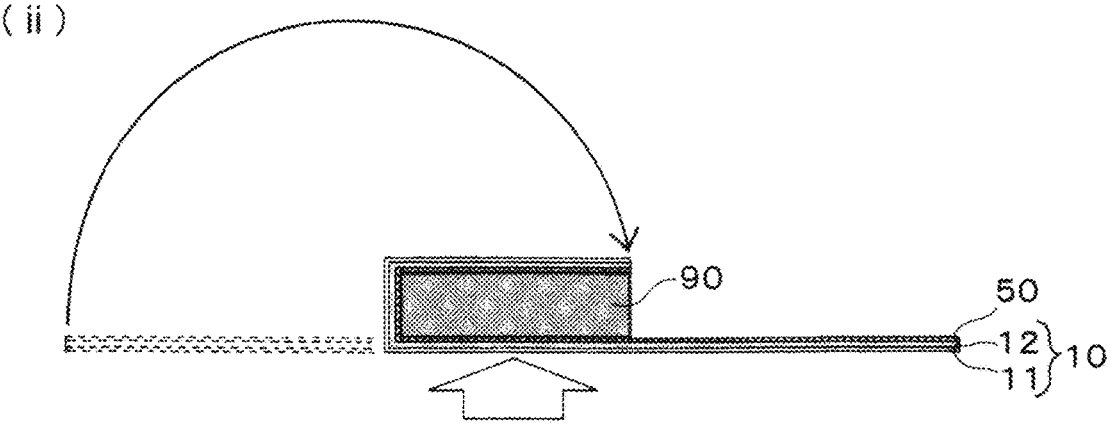
Figure 3:
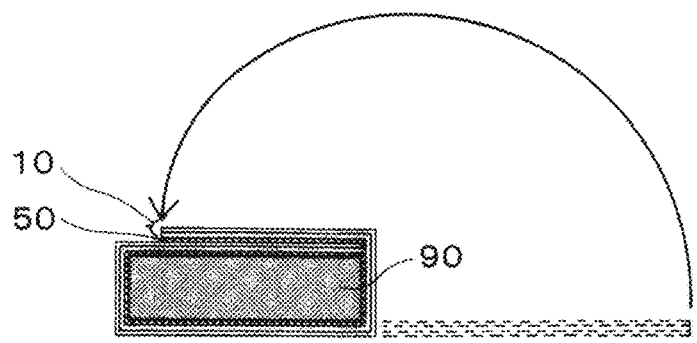
Figure 3:
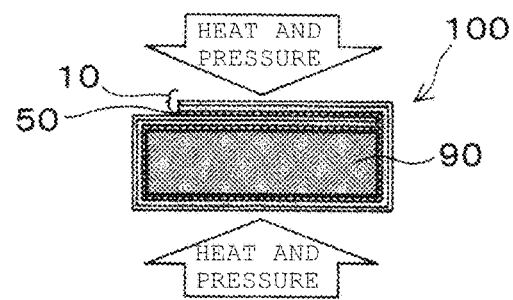

First, the separator 50 is provided on the main surface of the electrode material layer 12 of the elongated outermost layer electrode 10 (having the electrode material layer 12 on one main surface of the current collector 11) (FIG. 3(*i*)). Specifically, as the separator 50, it is preferable to use a separator having adhesive layers on both main surfaces thereof. The presence of the adhesive layer makes it possible to adhere the elongated outermost layer electrode 10 and the separator 50 to obtain the outermost layer electrode 10 with the elongated separator 50. Then, the partial electrode assembly 90 is surrounded using the outermost layer electrode 10 with the separator 50 along at least a portion of the contour of the partial electrode assembly 90 in cross-sectional view (FIG. 3(*ii*), FIG. 3(*iii*)). That is, the outermost layer electrode 10 with the separator 50 is wound around the partial electrode assembly 90 along at least a portion of the contour of the partial electrode assembly 90 in cross-sectional view. Although not limited thereto, as an example, the partial electrode assembly 90 is provided on a central region of the separator 50 of the outermost layer electrode 10 with the elongated separator 50. Then, the outermost layer electrode 10 with the elongated separator 50 is wound around and adhered onto one side surface of the partial electrode assembly 90 and an upper surface continuing to the side surface in cross-sectional view (FIG. 3(*ii*)). In detail, since the separator having the adhesive layers on both main surfaces thereof is used as the separator 50 as described above, the outermost layer electrode 10 with the separator 50 can be adhered to the partial electrode assembly 90 by the presence of the adhesive layer when the outermost layer electrode 10 is wound. Then, the remaining outermost layer electrode 10 with the elongated separator 50 is wound around and adhered onto the outermost layer electrode 10 with the separator 50 adhered onto the other side surface of the partial electrode assembly 90 and the upper surface of the partial electrode assembly 90 in FIG. 3(*ii*) in cross-sectional view (FIG. 3(*iii*)). Thereby, a precursor 101 of the electrode assembly 100 provided with the outermost layer electrode 10 and the partial electrode assembly 90 is obtained. Next, the precursor 101 of the electrode assembly 100 is subjected to heat and pressure treatment (FIG. 3(*iv*)). Thus, the desired electrode assembly 100 is finally obtained.

The manufacturing method according to an embodiment of the present invention preferably adopts the following aspect.

In one aspect, preferably, in cross-sectional view, the outermost layer electrode 10 surrounds the partial electrode assembly 90 along the contours formed by both main surfaces of the partial electrode assembly 90 and at least one side surface of the partial electrode assembly 90 continuing to the both main surfaces (see FIGS. 3(*ii*) and (iii)).

In order to apply tension to the outermost layer electrode 10 as described above, the outermost layer electrode 10 needs to straddle at least two bent portions of the partial electrode assembly 90. The straddling can be realized when, in cross-sectional view, the outermost layer electrode 10 surrounds the partial electrode assembly 90 along the contours of both main surfaces of at least the partial electrode assembly 90 and at least one side surface 90β of the partial electrode assembly 90 continuing to the both main surfaces. Thus, the outermost layer electrode 10 can be suitably "pulled". That is, tension can be suitably applied to the outermost layer electrode 10.

In one aspect, preferably, the separator 50 with an adhesive layer is used, the outermost layer electrode 10 and the partial electrode assembly 90 are integrated to form the precursor 101 of the electrode assembly 100, and the precursor 101 of the electrode assembly 100 is subjected to heat and pressure (see FIG. 3(*iv*)).

As described above, in the present invention, as the separator 50, it is preferable to use a separator having adhesive layers on both main surfaces thereof. When the separator 50 with an adhesive layer is used, the outermost layer electrode 10 and the partial electrode assembly 90 can be suitably integrated due to the fact that the separator 50 with an adhesive layer is located between the outermost layer electrode 10 and the partial electrode assembly 90. In particular, when the precursor 101 of the electrode assembly 100 obtained by integration is subjected to heat and pressure, connectivity (adhesion) between layers can be improved.

Therefore, the outermost layer electrode 10 and the partial electrode assembly 90 can be more suitably integrated by the heat and pressure treatment. Thereby, it is possible to "maintain" or "continue" holding of a predetermined form (shape) of the outermost layer electrode 10 due to predetermined tension applied to the outermost layer electrode 10. By "maintaining" or "continuing" the holding of the form of the outermost layer electrode 10, it is possible to more suitably suppress occurrence of the warpage stress for which in the outermost layer electrode 10, the main surface of the electrode material layer 12 may become an outer curved surface, and the main surface of the current collector 11 may become an inner curved surface.

In one aspect, preferably, an outermost layer electrode having overlapping regions overlapping with each other in cross-sectional view is formed as the outermost layer electrode 10, and only the current collector 11 is provided to an outer portion of the overlapping region 10X of the outermost layer electrode 10 in cross-sectional view (see FIG. 5).

In the present aspect, only the current collector 11 is provided to the outer portion 10X$_1$ of the overlapping region 10X of the outermost layer electrode 10 in cross-sectional view. In this case, it is possible to suitably suppress flowing of a short circuit current to the inner region of the electrode assembly 100 due to absence of the electrode material layer 12 in the outer portion 10X$_1$ of the overlapping region 10X of the outermost layer electrode 10. As a result, the safety of the battery can be maintained and improved.

In one aspect, preferably, separator 50 which is more elongate than the outermost layer electrode 10 and includes the extending portion 50X extending from one end of the outermost layer electrode 10 is provided, and the extending portion 50X of the separator 50 is fixed to the outermost layer electrode 10 located inside the separator 50 in cross-sectional view (see FIG. 6).

In the present aspect, only the separator 50 is provided without providing the current collector 11 and the electrode material layer 12 at a position corresponding to the outer portion of the overlapping region of the outermost layer electrode 10. Thereby, as compared with a case where the current collector 11 and the electrode material layer 12 are provided also to the outer portion of the overlapping region of the outermost layer electrode 10 with the separator 50 interposed therebetween, due to absence of the current collector 11 and the electrode material layer 12, the thicknesses of the current collector 11 and the electrode material layer 12 in the overlapping region of the outermost layer electrode 10 can be relatively reduced. Thus, it is possible to suppress the reduction in the energy density of the battery due to the thickness reduction of the current collector 11 and the electrode material layer 12.

In one aspect, preferably, the outermost layer electrode 10 in the portion facing the side surface 90β of the partial electrode assembly 90 has a single-sided electrode structure in cross-sectional view, and the outermost layer electrode 10 is used as a negative electrode (see FIG. 1).

In the present aspect, since the outermost layer electrode 10 in the portion facing the side surface 90β of the partial electrode assembly 90 has the single-sided electrode structure in cross-sectional view, the electrode material layer 11 is positioned also to the portion facing the side surface 90β of the partial electrode assembly 90. When a negative electrode including a negative electrode material layer is used as the outermost layer electrode 10, the negative electrode material layer can function as a layer capable of accepting lithium ions, so that lithium ions which can move in the side surface region of the partial electrode assembly 90 can be suitably accepted. Therefore, deposition of lithium on the negative electrode end of the partial electrode assembly 90 due to lithium ion movement can be suitably suppressed, whereby the safety of the battery can be improved.

The outermost layer electrode 10 in the portion facing the side surface 90β of the partial electrode assembly 90 may have a structure having only the current collector 11 in cross-sectional view (see FIG. 7). According to this structure, since the electrode material layer 12 does not exist in the outermost layer electrode 10 in the portion facing the side surface 90β of the partial electrode assembly 90, as compared with the case where the outermost layer electrode 10 includes the electrode material layer 12, the width dimension of the electrode assembly 100 finally obtained can be relatively reduced.

In one aspect, preferably, the current collector 11 of the outermost layer electrode 10 is positioned so as to extend over only a portion of the tab 20 (positive electrode tab 20A, negative electrode tab 20B) of the double-sided electrode of the partial electrode assembly 90 in a planar view thereof (see FIG. 8).

In the present aspect, the current collector 11 of the outermost layer electrode 10 is positioned inside the end 20α (a projecting end portion of the tab 20 located on the outermost side in planar view) of the tab 20 provided to the partial electrode assembly 90 in planar view. Due to the inner arrangement of the current collector 11 of the outermost layer electrode 10, the extended tab 20 provided to the partial electrode assembly 90 can be more easily exposed compared to the case where the end of the current collector 11 is substantially flush with the end 20α of the extended tab 20 provided to the partial electrode assembly 90 in planar view due to this. Thus, a portion of the current collector 11 exposed at the end of the outermost layer electrode 10 can be easily welded to the extended tab 20.

In one aspect, preferably, only a tab provided to the outermost layer electrode 10 is locally overlapped with the tab of the partial electrode assembly 90 in planar view (see FIG. 9).

In the present aspect, for example, when a negative electrode is used as the outermost layer electrode, from the viewpoint of preventing the short circuit, preferably the outermost layer electrode 10 is provided with a negative electrode tab, and only the negative electrode tab is locally overlapped with a negative electrode tab of the partial electrode assembly 90 in planar view. Thereby, it can be avoided that after winding, the positive electrode tab of the partial electrode assembly 90 and a portion of the negative-electrode-side current collector face each other in planar view. From the above, by avoiding the mutually facing state, it is possible to avoid a short circuit due to the fact that the positive electrode tab of the partial electrode assembly 90 and a portion of the negative-electrode-side current collector face each other in planar view. Therefore, the safety of the battery can be improved.

In one aspect, preferably, the separator 50 which is more elongate than the outermost layer electrode 10 and includes the extending portions 50X extending from both ends of the outermost layer electrode 10 is provided, and the extending portions 50X of the separators 50 are connected to each other (see FIG. 10).

In the present aspect, a portion of the partial electrode assembly 90 is surrounded by the outermost layer electrode 10 in cross-sectional view, and the remaining portion of the partial electrode assembly 90 is surrounded only by the extending portion 50X of the separator 50. That is, in the present aspect, only the separator 50 is positioned at a predetermined position of the contour of the partial electrode assembly 90. That is, in the present aspect, the current collector 11 and the electrode material layer 12 do not exist at predetermined positions of the contour of the partial electrode assembly 90. Accordingly, in the present aspect, compared to the case where the outermost layer electrode 10 including the current collector 11 and the electrode material layer 12 is provided along the entire contour of the partial electrode assembly 90, the thicknesses of the current collector 11 and the electrode material layer 12 can be relatively reduced at a portion where only the separator 50 is provided. As a result, the energy density of the battery can be improved.

INDUSTRIAL APPLICABILITY

The secondary battery according to an embodiment of the present invention can be used in various fields in which electricity storage is assumed. Although the followings are merely examples, the secondary battery according to an embodiment of the present invention, in particular, the nonaqueous electrolyte secondary battery can be used in electricity, information and communication fields where mobile devices and the like are used (e.g., mobile device fields, such as mobile phones, smart phones, laptop computers, digital cameras, activity meters, arm computers, and electronic papers), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), IoT fields, and space and deep sea applications (e.g., the fields such as spacecraft and research submarines).

DESCRIPTION OF REFERENCE SYMBOLS

10, 10': Outermost layer electrode
10A, 10A': Positive electrode
10B, 10B': Negative electrode
10X: Overlapping region of outermost layer electrode
10X$_1$: Outer portion of overlapping region of outermost layer electrode
10X$_2$: Inner portion of overlapping region of outermost layer electrode
10a: End of outermost layer electrode
11, 11': Current collector
11α: End of current collector
12, 12': Electrode material layer
20: Tab
20A: Positive electrode tab
20B: Negative electrode tab
20α: End of tab
20B$_1$: Negative electrode tab of outermost layer negative electrode
20B$_2$: Negative electrode tab of partial electrode assembly
50, 50': Separator
50X: Extending portion of separator
90: Partial electrode assembly
90α: Main surface of partial electrode assembly
90β: Side surface of partial electrode assembly
100, 100': Electrode assembly

The invention claimed is:

1. A secondary battery comprising:
a partial electrode assembly having a planar stacking structure in which a plurality of electrode constituting layers are stacked, the plurality of electrode constituting layers each including a pair of electrodes and a separator disposed therebetween, wherein at least one of the pair of electrodes includes a double-sided electrode having an electrode material layer on opposed main surfaces of a current collector; and
an outermost layer electrode surrounding the partial electrode assembly along at least a portion of a contour of the partial electrode assembly in a cross-sectional view thereof, the outermost layer electrode including a single-sided electrode having an outermost electrode material layer on one main surfaces of an outermost current collector.

2. The secondary battery according to claim 1, wherein in the cross-sectional view, the outermost layer electrode surrounds the partial electrode assembly along contours of opposed main surfaces of the partial electrode assembly and at least one side surface of the partial electrode assembly connecting the opposed main surfaces.

3. The secondary battery according to claim 1, further comprising an outermost separator between the outermost layer electrode and the partial electrode assembly.

4. The secondary battery according to claim 1, wherein
the outermost layer electrode has an overlapping region where the outermost layer electrode overlaps with itself in the cross-sectional view, and
only the outermost current collector is located on an outer portion of the overlapping region.

5. The secondary battery according to claim 3, wherein the outermost separator is more elongate than the outermost layer electrode and includes an extending portion extending from an end of the outermost layer electrode, and the extending portion of the outermost separator is fixed to the outermost layer electrode.

6. The secondary battery according to claim 1, wherein the outermost layer electrode is a negative electrode.

7. The secondary battery according to claim 2, wherein a portion of the outermost layer electrode facing the at least one side surface of the partial electrode assembly has only the current collector in the cross-sectional view.

8. The secondary battery according to claim 1, wherein the outermost current collector of the outermost layer electrode extends over only a portion of a tab of the double-sided electrode of the partial electrode assembly in a planar view thereof.

9. The secondary battery according to claim 1, wherein the outermost layer electrode includes a first tab, and only the first tab of the outermost layer electrode overlaps with a second tab of the partial electrode assembly in a planar view thereof.

10. The secondary battery according to claim 1, wherein the outermost separator is more elongate than the outermost layer electrode and includes first and second extending portions extending from respective opposed ends of the outermost layer electrode, and the first and second extending portions of the outermost separator are connected to each other.

11. The secondary battery according to claim 1, wherein a portion of the outermost current collector of the outermost layer electrode is exposed and positioned outside the outermost separator and the outermost electrode material layer in a planar view thereof.

12. The secondary battery according to claim 1, wherein the pair of electrodes include a positive electrode and a negative electrode, and the positive electrode and the negative electrode have a layer capable of inserting and extracting lithium ions.

13. A method of manufacturing a secondary battery, the method comprising:

forming a partial electrode assembly having a planar stacking structure in which a plurality of electrode constituting layers are stacked, the plurality of electrode constituting layers each including a pair of electrodes and a separator disposed therebetween, wherein at least one of the pair of electrodes includes a double-sided electrode having an electrode material layer on opposed main surfaces of a current collector; and surrounding the partial electrode assembly along at least a portion of a contour of the partial electrode assembly in a cross-sectional view thereof, the outermost layer electrode including a single-sided electrode having an outermost electrode material layer on one main surfaces of an outermost current collector.

14. The manufacturing method according to claim 13, wherein in the cross-sectional view, the outermost layer electrode surrounds the partial electrode assembly along contours of opposed main surfaces of the partial electrode assembly and at least one side surface of the partial electrode assembly connecting the opposed main surfaces.

15. The manufacturing method according to claim 13, further comprising providing an outermost separator between the outermost layer electrode and the partial electrode assembly.

16. The manufacturing method according to claim 13, wherein the outermost layer electrode surrounds the partial electrode assembly such that the outermost layer electrode has an overlapping region where the outermost layer electrode overlaps with itself in the cross-sectional view, and wherein only the outermost current collector is located on an outer portion of the overlapping region.

17. The manufacturing method according to claim 15, wherein the outermost separator is more elongate than the outermost layer electrode and includes an extending portion extending from an end of the outermost layer electrode, and wherein the extending portion of the outermost separator is fixed to the outermost layer electrode.

18. The manufacturing method according to claim 13, wherein the outermost layer electrode is a negative electrode.

19. The manufacturing method according to claim 14, wherein a portion the outermost layer electrode facing the at least one side surface of the partial electrode assembly has only the current collector in the cross-sectional view.

20. The manufacturing method according to claim 13, wherein the outermost current collector of the outermost layer electrode extends over only a portion of a tab of the double-sided electrode of the partial electrode assembly in a planar view thereof.

21. The manufacturing method according to claim 13, wherein the outermost layer electrode has a first tab, and only the first tab of the outermost layer electrode overlaps with a second tab of the partial electrode assembly in a planar view thereof.

22. The manufacturing method according to claim 13, wherein the separator is more elongate than the outermost layer electrode and includes first and second extending portions extending from respective opposed ends of the outermost layer electrode, and wherein the extending portions of the separator are connected to each other.

* * * * *